(12) United States Patent
Bito

(10) Patent No.: US 8,576,492 B2
(45) Date of Patent: Nov. 5, 2013

(54) ZOOM LENS SYSTEM, IMAGING DEVICE AND CAMERA

(75) Inventor: Takakazu Bito, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/607,835

(22) Filed: Sep. 10, 2012

(65) Prior Publication Data

US 2013/0002934 A1    Jan. 3, 2013

Related U.S. Application Data

(63) Continuation of application No. PCT/JP2012/000064, filed on Jan. 6, 2012.

(30) Foreign Application Priority Data

Jan. 24, 2011    (JP) .................................. 2011-012342

(51) Int. Cl.
  *G02B 15/14*    (2006.01)
  *G02B 7/02*    (2006.01)

(52) U.S. Cl.
  USPC .......................................... 359/676; 359/817

(58) Field of Classification Search
  USPC .................................. 359/676, 687
  See application file for complete search history.

(56) References Cited

U.S. PATENT DOCUMENTS

| 2006/0066954 | A1* | 3/2006 | Sato | 359/686 |
| 2009/0073574 | A1* | 3/2009 | Yoshitsugu | 359/687 |
| 2009/0116121 | A1* | 5/2009 | Take | 359/687 |

FOREIGN PATENT DOCUMENTS

| JP | 2001-350093 A | 12/2001 |
| JP | 2003-227992 A | 8/2003 |
| JP | 2007-047538 A | 2/2007 |
| JP | 2007-233130 A | 9/2007 |
| JP | 2007-240587 A | 9/2007 |
| JP | 2008-281927 A | 11/2008 |
| JP | 2008-304708 A | 12/2008 |
| JP | 2009-086437 A | 4/2009 |
| JP | 2009-115875 A | 5/2009 |
| JP | 2009-282429 A | 12/2009 |

* cited by examiner

*Primary Examiner* — Jordan Schwartz
(74) *Attorney, Agent, or Firm* — Judge Patent Associates

(57) ABSTRACT

A zoom lens system comprising: a positive first lens unit; a negative second lens unit; a positive third lens unit; and one or more subsequent lens units, wherein in zooming, the first to third lens units are moved along an optical axis to perform magnification change, a lens unit α which is one of the subsequent lens units does not move during zooming, but moves during transition from an imaging state to an accommodated state, and the conditions: $0.8 < L_T/f_T < 1.2$, $0.12 < D_\alpha/f_{G\alpha} < 0.30$ and $f_T/f_W > 9.0$ ($L_T$: overall length of lens system at a telephoto limit, $D_\alpha$: axial air-equivalent length between a most image side surface of the lens unit α and an image surface, $f_{G\alpha}$: focal length of the lens unit α, $f_W$ and $f_T$: focal lengths of the entire system at a wide-angle limit and a telephoto limit) are satisfied.

10 Claims, 22 Drawing Sheets

ZOOM LENS SYSTEM, IMAGING DEVICE AND CAMERA

BACKGROUND

1. Field

The present disclosure relates to zoom lens systems, imaging devices and cameras.

2. Description of the Related Art

Cameras including an image sensor for performing photoelectric conversion, such as digital still cameras and digital video cameras, have been required to have high resolution, and particularly in recent years, these cameras have been strongly required to have a reduced thickness, a relatively high zooming ratio, and capability of compensating various aberrations. For example, various kinds of zoom lens systems have been proposed, each having a three-or-more unit configuration of positive, negative, and positive, or positive, negative, and negative, in which a first lens unit having positive optical power, a second lens unit having negative optical power, a third lens unit having positive or negative optical power, and a subsequent lens unit are arranged in order from an object side to an image side. Hereinafter, the cameras including an image sensor for performing photoelectric conversion, such as digital still cameras and digital video cameras, are simply referred to as "digital cameras".

Japanese Laid-Open Patent Publications Nos. 2009-282429, 2009-115875, 2009-086437, and 2008-304708 each disclose a zoom lens having the three-or-more unit configuration of positive, negative, and positive.

Japanese Laid-Open Patent Publication No. 2008-281927 discloses a variable-magnification optical system having the three-or-more unit configuration of positive, negative, and positive.

Japanese Laid-Open Patent Publication No. 2007-047538 discloses an imaging optical system having the three-or-more unit configuration of positive, negative, and positive, or positive, negative, and negative.

Japanese Laid-Open Patent Publication No. 2001-350093 discloses an imaging lens device equipped with a zoom lens system having the three-or-more unit configuration of positive, negative, and positive.

SUMMARY

The present disclosure provides: a high-performance and thin zoom lens system that has, as well as high resolution, a relatively high zooming ratio, but has less aberration fluctuation in zooming; an imaging device employing the zoom lens system; and a thin and compact camera employing the imaging device.

The novel concepts disclosed herein were achieved in order to solve the foregoing problems in the related art, and herein is disclosed:

a zoom lens system, in order from an object side to an image side, comprising:
a first lens unit having positive optical power;
a second lens unit having negative optical power;
a third lens unit having positive optical power; and
one or more subsequent lens units, wherein
in zooming from a wide-angle limit to a telephoto limit at the time of image taking, the first lens unit, the second lens unit, and the third lens unit are moved along an optical axis to perform magnification change,
a lens unit α which is one of the subsequent lens units does not move along the optical axis at the time of the zooming, but moves along the optical axis at the time of transition from an imaging state to an accommodated state, and
the following conditions (1), (2-1) and (a) are satisfied:

$$0.8 < L_T/f_T < 1.2 \quad (1)$$

$$0.12 < D_\alpha/f_{G\alpha} < 0.30 \quad (2\text{-}1)$$

$$f_T/f_W > 9.0 \quad (a)$$

where,
$L_T$ is an overall length of lens system (a distance from a most object side surface of the first lens unit to an image surface) at a telephoto limit,
$D_\alpha$ is an axial air-equivalent length between a most image side surface of the lens unit α and the image surface,
$f_{G\alpha}$ is a composite focal length of the lens unit α,
$f_W$ is a focal length of the entire system at a wide-angle limit, and
$f_T$ is a focal length of the entire system at a telephoto limit.

The novel concepts disclosed herein were achieved in order to solve the foregoing problems in the related art, and herein is disclosed:

an imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system, in order from an object side to an image side, comprising:
a first lens unit having positive optical power;
a second lens unit having negative optical power;
a third lens unit having positive optical power; and
one or more subsequent lens units, wherein
in zooming from a wide-angle limit to a telephoto limit at the time of image taking, the first lens unit, the second lens unit, and the third lens unit are moved along an optical axis to perform magnification change,
a lens unit α which is one of the subsequent lens units does not move along the optical axis at the time of the zooming, but moves along the optical axis at the time of transition from an imaging state to an accommodated state, and
the following conditions (1), (2-1) and (a) are satisfied:

$$0.8 < L_T/f_T < 1.2 \quad (1)$$

$$0.12 < D_\alpha/f_{G\alpha} < 0.30 \quad (2\text{-}1)$$

$$f_T/f_W > 9.0 \quad (a)$$

where,
$L_T$ is an overall length of lens system (a distance from a most object side surface of the first lens unit to an image surface) at a telephoto limit,
$D_\alpha$ is an axial air-equivalent length between a most image side surface of the lens unit α and the image surface,
$f_{G\alpha}$ is a composite focal length of the lens unit α,
$f_W$ is a focal length of the entire system at a wide-angle limit, and
$f_T$ is a focal length of the entire system at a telephoto limit.

The novel concepts disclosed herein were achieved in order to solve the foregoing problems in the related art, and herein is disclosed:

a camera for converting an optical image of an object into an electric image signal, and performing at least one of displaying and storing of the converted image signal, comprising:
an imaging device including a zoom lens system that forms the optical image of the object, and an image sensor that converts the optical image formed by the zoom lens system into the electric image signal, wherein the zoom lens system is a zoom lens system, in order from an object side to an image side, comprising:
a first lens unit having positive optical power;
a second lens unit having negative optical power;
a third lens unit having positive optical power; and
one or more subsequent lens units, wherein
in zooming from a wide-angle limit to a telephoto limit at the time of image taking, the first lens unit, the second lens unit, and the third lens unit are moved along an optical axis to perform magnification change,
a lens unit α which is one of the subsequent lens units does not move along the optical axis at the time of the zooming, but moves along the optical axis at the time of transition from an imaging state to an accommodated state, and
the following conditions (1), (2-1) and (a) are satisfied:

$$0.8 < L_T/f_T < 1.2 \qquad (1)$$

$$0.12 < D_\alpha/f_{G\alpha} < 0.30 \qquad (2\text{-}1)$$

$$f_T/f_W > 9.0 \qquad (a)$$

where, $L_T$ is an overall length of lens system (a distance from a most object side surface of the first lens unit to an image surface) at a telephoto limit, $D_\alpha$ is an axial air-equivalent length between a most image side surface of the lens unit α and the image surface, $f_{G\alpha}$ is a composite focal length of the lens unit α, $f_W$ is a focal length of the entire system at a wide-angle limit, and $f_T$ is a focal length of the entire system at a telephoto limit.

A zoom lens system in the present disclosure is a high-performance and thin zoom lens system that has, as well as high resolution, a relatively high zooming ratio, but has less aberration fluctuation in zooming. An imaging device in the present disclosure employs the zoom lens system, and a camera employing the imaging device is thin and compact.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

Embodiments 1 to 7

FIGS. 1, 4, 7, 10, 13, 16 and 19 are lens arrangement diagrams of zoom lens systems according to Embodiments 1 to 7, respectively.

Figure 19:
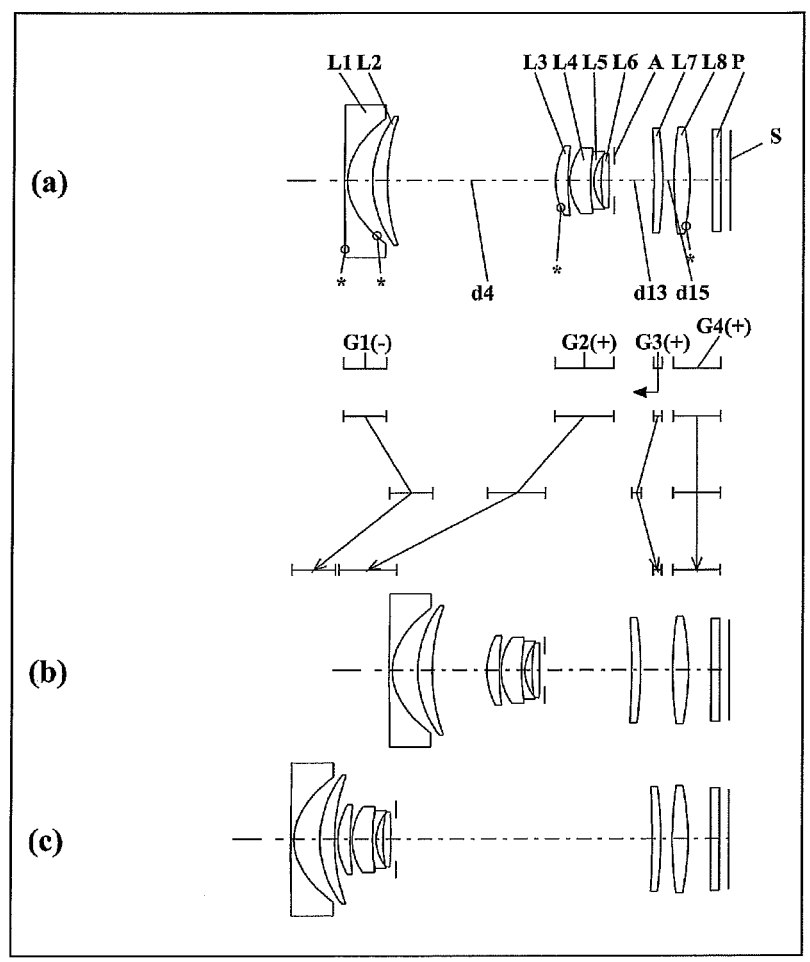
FIG. 19 is a lens arrangement diagram showing an infinity in-focus condition of a zoom lens system according to Embodiment 7 (Numerical Example 7)
Figure 20:
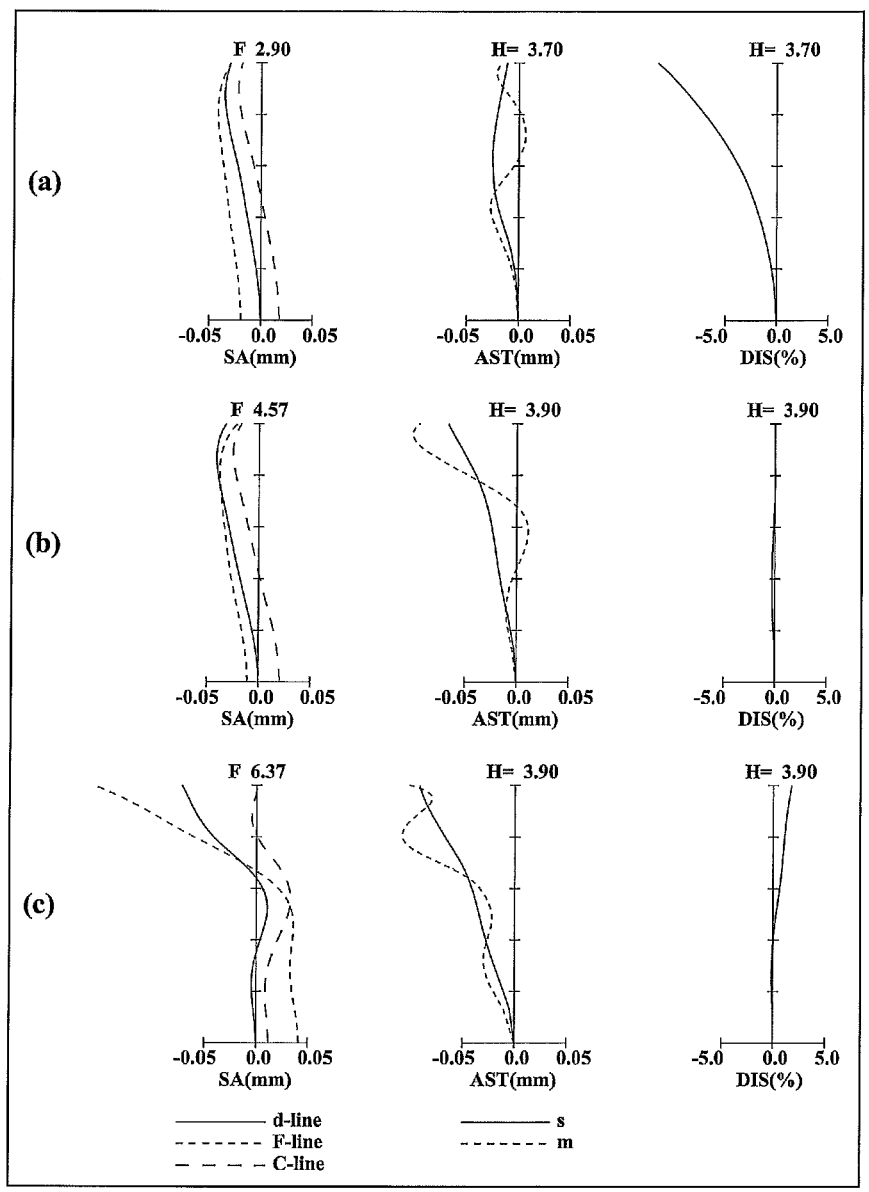
FIG. 20 is a longitudinal aberration diagram of an infinity in-focus condition of a zoom lens system according to Numerical Example 7.

Each of FIGS. 1, 4, 7, 10, 13, 16 and 19 shows a zoom lens system in an infinity in-focus condition. In each Fig., part (a) shows a lens configuration at a wide-angle limit, part (b) shows a lens configuration at a middle position, and part (c) shows a lens configuration at a telephoto limit. The wide-angle limit is the minimum focal length condition, and the focal length is expressed by $f_W$. The middle position is an intermediate focal length condition, and the focal length is expressed by $f_M = \sqrt{(f_W * f_T)}$. The telephoto limit is the maximum focal length condition, and the focal length is expressed by $f_T$. Further, in each Fig., each bent arrow provided between part (a) and part (b) indicates a line obtained by connecting the positions of each lens unit at a wide-angle limit, a middle position and a telephoto limit in order from the top. Accordingly, in the part between the wide-angle limit and the middle position, and the part between the middle position and the telephoto limit, the positions are connected simply with a straight line, and this line does not indicate an actual motion of each lens unit. Furthermore, in each Fig., an arrow imparted to a lens unit indicates focusing from an infinity in-focus condition to a close-object in-focus condition. That is, in FIGS. 1, 4, 7, 10, 13 and 16, the arrow indicates the direction in which a fourth lens unit G4 described later moves in focusing from the infinity in-focus condition to the close-object in-focus condition. In FIG. 19, the arrow indicates the direction in which a third lens unit G3 described later moves in focusing from the infinity in-focus condition to the close-object in-focus condition.

Each of the zoom lens systems according to Embodiments 1 to 6, in order from the object side to the image side, comprises: a first lens unit G1 having positive optical power; a second lens unit G2 having negative optical power; a third lens unit G3 having positive optical power; a fourth lens unit G4 having negative optical power; and a fifth lens unit G5 having positive optical power. The zoom lens system according to Embodiment 7, in order from the object side to the image side, comprises: a first lens unit G1 having negative optical power; a second lens unit G2 having positive optical power; a third lens unit G3 having positive optical power; and a fourth lens unit G4 having positive optical power.

In the zoom lens systems according to Embodiments 1 to 6, in zooming, the first lens unit G1, the second lens unit G2, the third lens unit G3, and the fourth lens unit G4 move in a direction along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 vary. In the zoom lens system according to Embodiment 7, in zooming, the first lens unit G1, the second lens unit G2, and the third lens unit G3 move in the direction along the optical axis such that the intervals between the respective lens units, that is, the interval between the first lens unit G1 and the second lens unit G2, the interval between the second lens unit G2 and the third lens unit G3, and the interval between the third lens unit G3 and the fourth lens unit G4 vary. In the zoom lens system according to each embodiment, by arranging the lens units in a desired optical power configuration, size reduction in the entire lens system is achieved while maintaining high optical performance.

In FIGS. 1, 4, 7, 10, 13, 16 and 19, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S, i.e., between the image surface S and the most image side lens surface in the fifth lens unit G5 in FIGS. 1, 4, 7, 10, 13 and 16, or between the image surface S and the most image side lens surface in the fourth lens unit G4 in FIG. 19, a plane parallel plate P equivalent to an optical low-pass filter or a face plate of an image sensor is provided.

Embodiment 1

Figure 1:
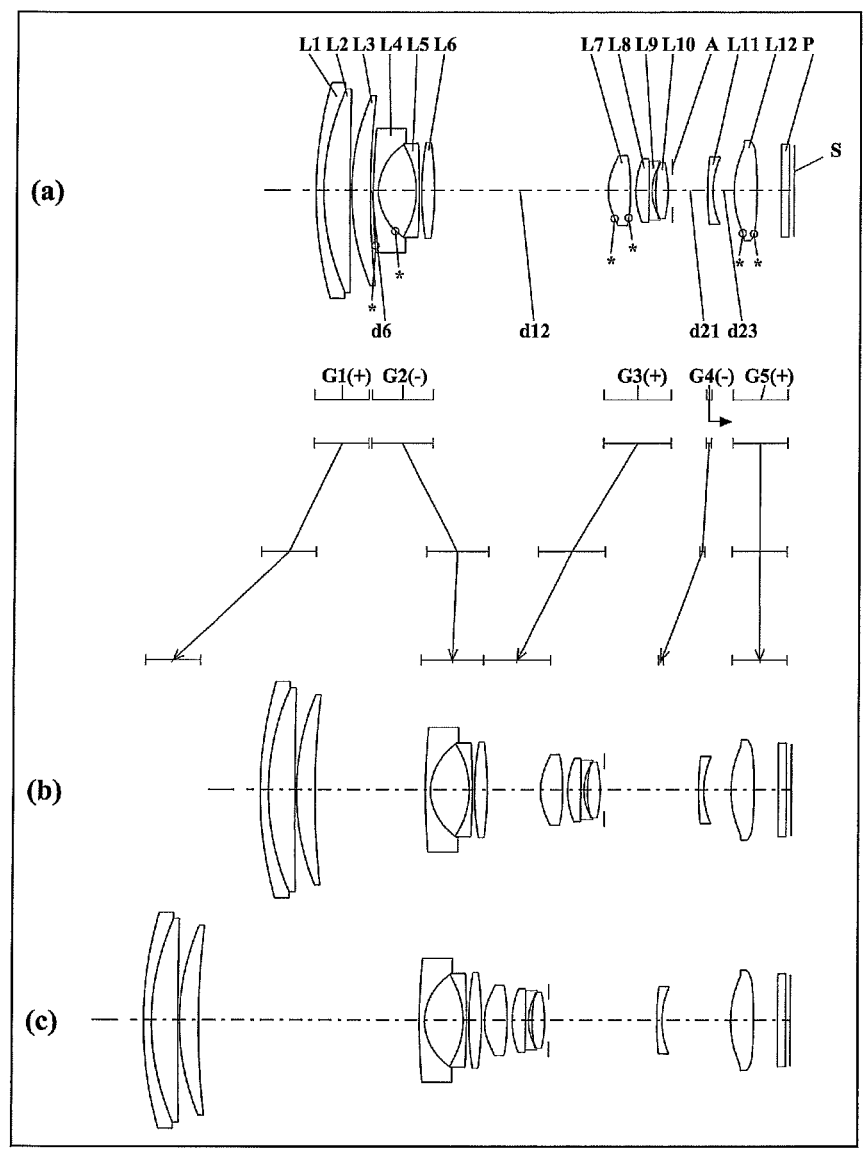
FIG. 1 is a lens arrangement diagram showing an infinity in-focus condition of a zoom lens system according to Embodiment 1 (Numerical Example 1)
Figure 2:
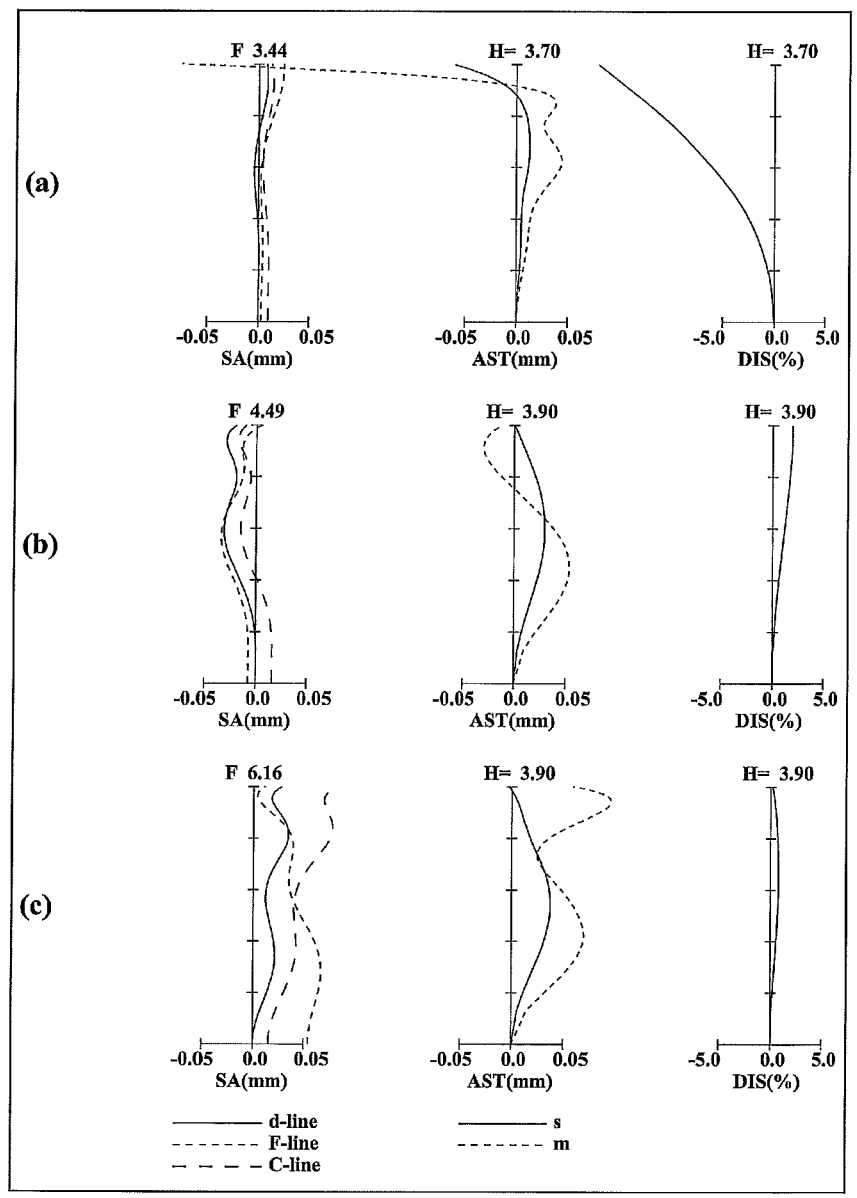
FIG. 2 is a longitudinal aberration diagram of an infinity in-focus condition of a zoom lens system according to Numerical Example 1.
Figure 3:
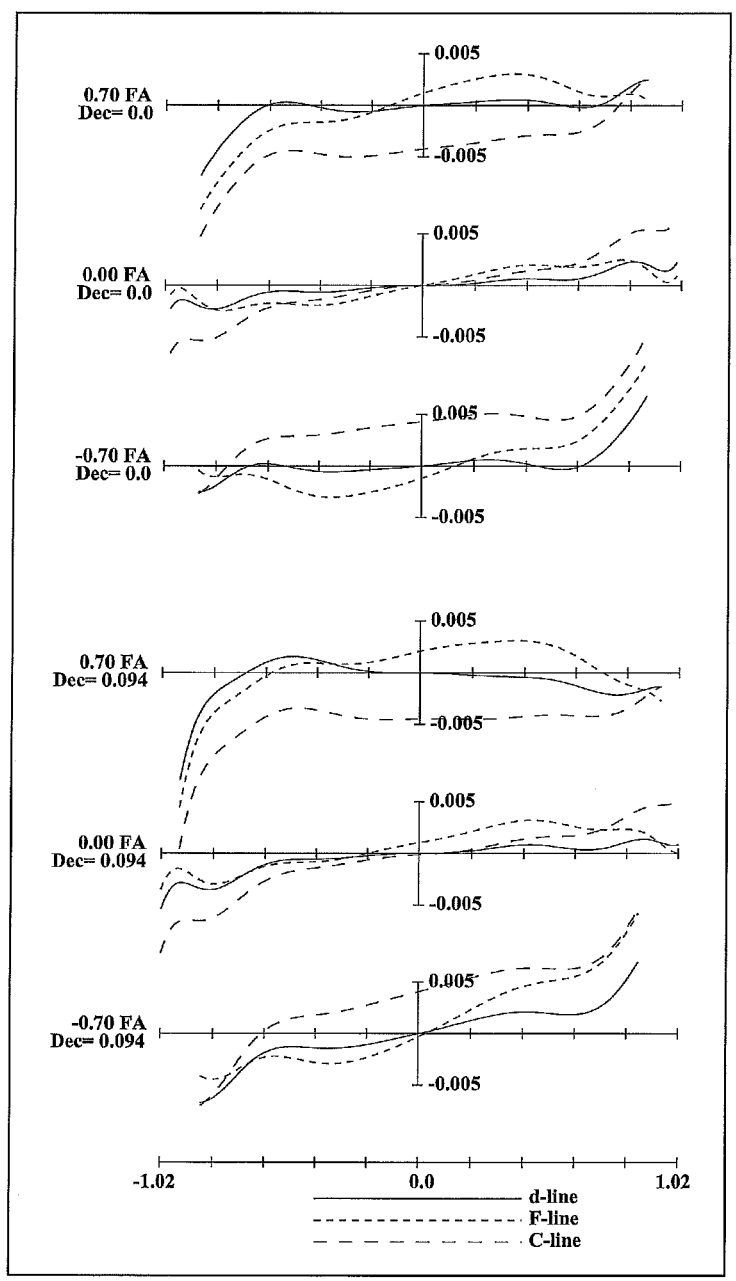
FIG. 3 is a lateral aberration diagram of a zoom lens system according to Numerical Example 1 at a telephoto limit in a basic state where image blur compensation is not performed and in an image blur compensation state.

As shown in FIG. 1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces.

The third lens unit G3, in order from the object side to the image side, comprises: a bi-convex seventh lens element L7; a bi-convex eighth lens element L8, a bi-concave ninth lens element L9; and a bi-convex tenth lens element L10. Among these, the eighth lens element L8 and the ninth lens element L9 are cemented with each other. In the surface data of the corresponding Numerical Example described later, surface number 16 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 1, an aperture diaphragm A is provided between the third lens unit G3 and the fourth lens unit G4. In zooming from a wide-angle limit to a telephoto limit at the time of image taking, the aperture diaphragm A moves along the optical axis to the object side, integrally with the third lens unit G3.

In the zoom lens system according to Embodiment 1, a plane parallel plate P is provided on the object side relative to the image surface S, i.e., between the image surface S and the twelfth lens element L12.

In the zoom lens system according to Embodiment 1, in zooming from a wide-angle limit to a telephoto limit at the time of image taking, the first lens unit G1 and the fourth lens unit G4 move nearly monotonically to the object side, the second lens unit G2 moves to the image side with locus of a convex to the image side, the third lens unit G3 moves monotonically to the object side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 increases.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 1, in focusing from an infinity in-focus condition to a close-object in-focus condition, the fourth lens unit G4 moves along the optical axis to the image side.

Embodiment 2

Figure 4:
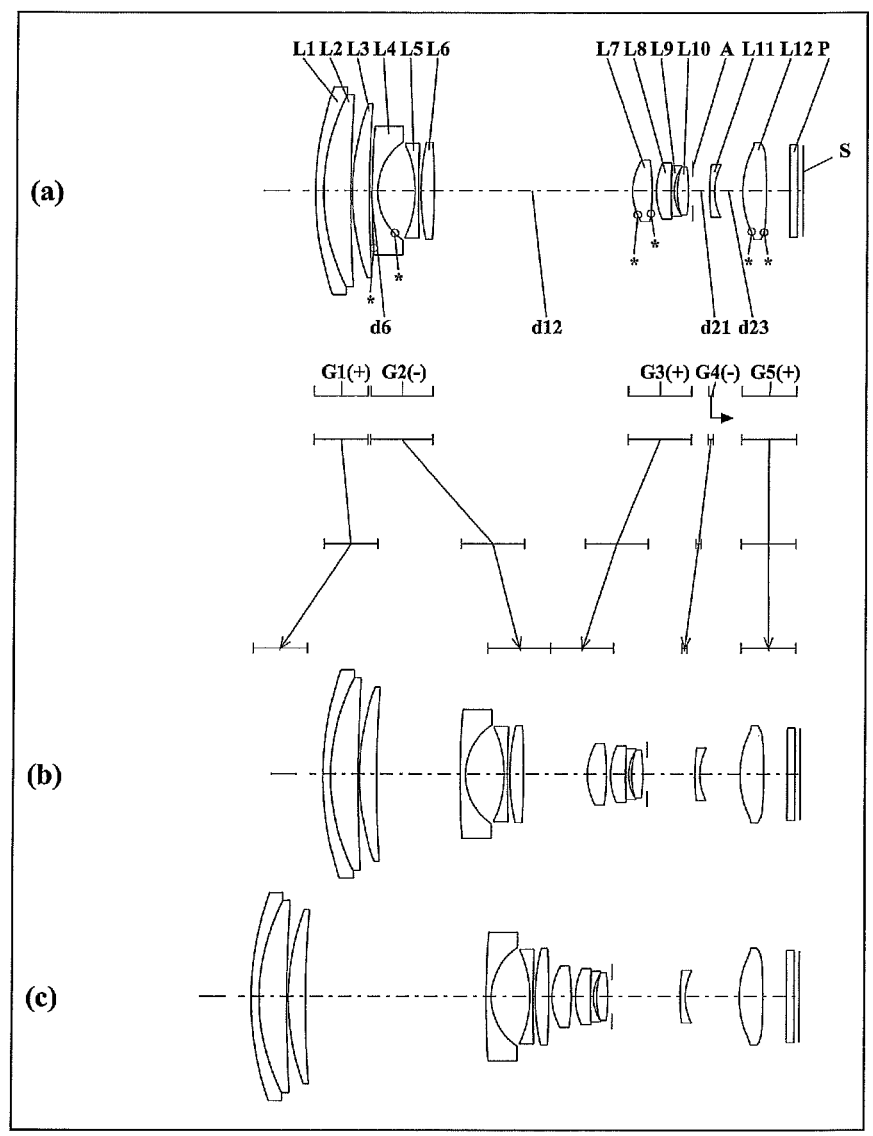
FIG. 4 is a lens arrangement diagram showing an infinity in-focus condition of a zoom lens system according to Embodiment 2 (Numerical Example 2)
Figure 5:
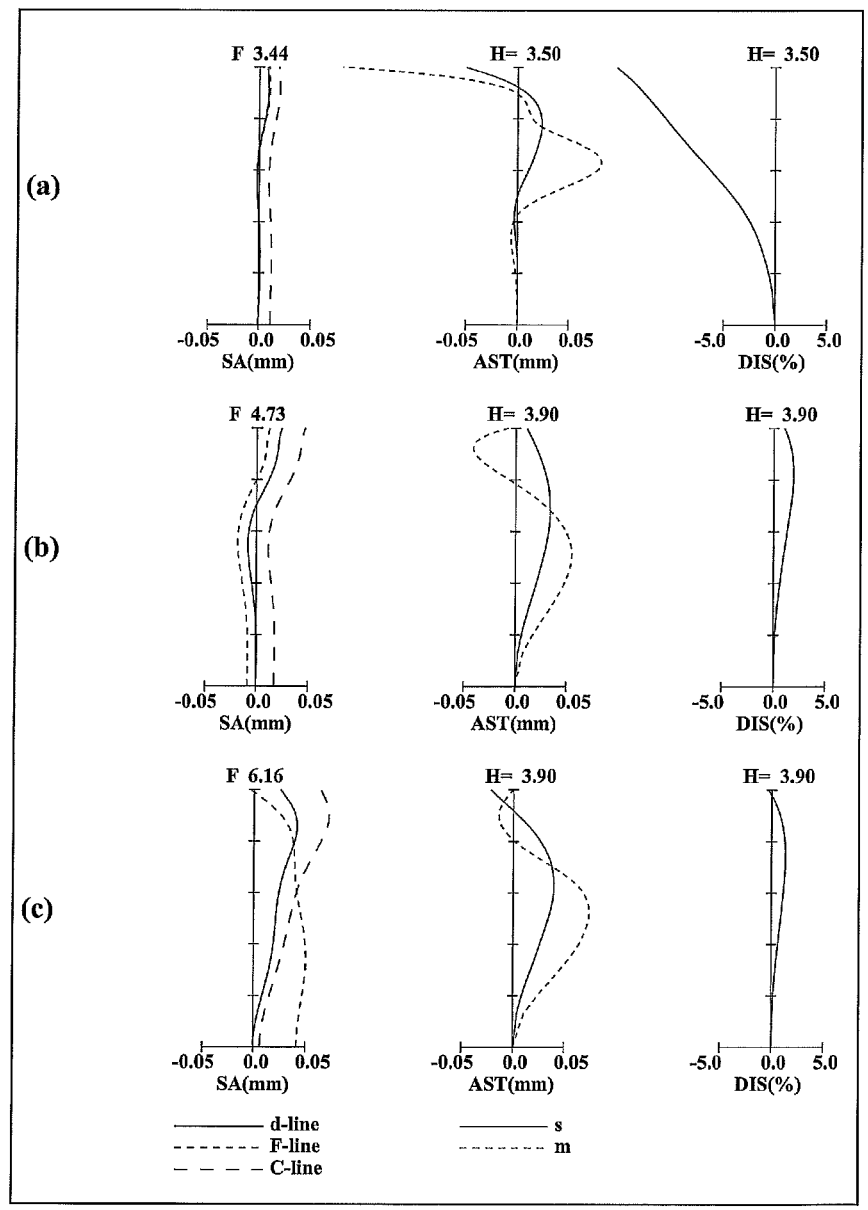
FIG. 5 is a longitudinal aberration diagram of an infinity in-focus condition of a zoom lens system according to Numerical Example 2.
Figure 6:
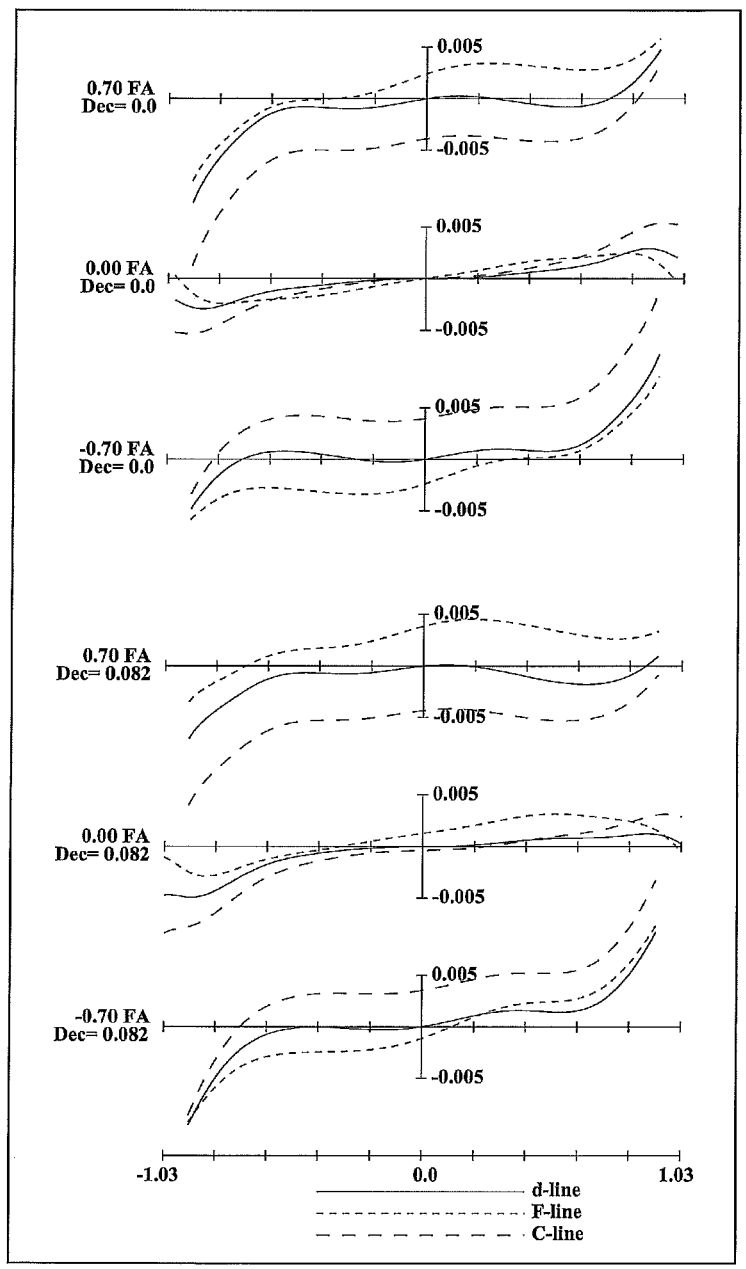
FIG. 6 is a lateral aberration diagram of a zoom lens system according to Numerical Example 2 at a telephoto limit in a basic state where image blur compensation is not performed and in an image blur compensation state.

As shown in FIG. 4, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces.

The third lens unit G3, in order from the object side to the image side, comprises: a bi-convex seventh lens element L7; a positive meniscus eighth lens element L8 with the convex surface facing the object side; a negative meniscus ninth lens element L9 with the convex surface facing the object side; and a bi-convex tenth lens element L10. Among these, the eighth lens element L8 and the ninth lens element L9 are cemented with each other. In the surface data of the corresponding Numerical Example described later, surface number 16 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 2, an aperture diaphragm A is provided between the third lens unit G3 and the fourth lens unit G4. In zooming from a wide-angle limit to a telephoto limit at the time of image taking, the aperture diaphragm A moves along the optical axis to the object side, integrally with the third lens unit G3.

In the zoom lens system according to Embodiment 2, a plane parallel plate P is provided on the object side relative to the image surface S, i.e., between the image surface S and the twelfth lens element L12.

In the zoom lens system according to Embodiment 2, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves nearly monotonically to the object side, the fourth lens unit G4 moves monotonically to the object side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 increases.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 2, in focusing from an infinity in-focus condition to a close-object in-focus condition, the fourth lens unit G4 moves along the optical axis to the image side.

Embodiment 3

Figure 7:
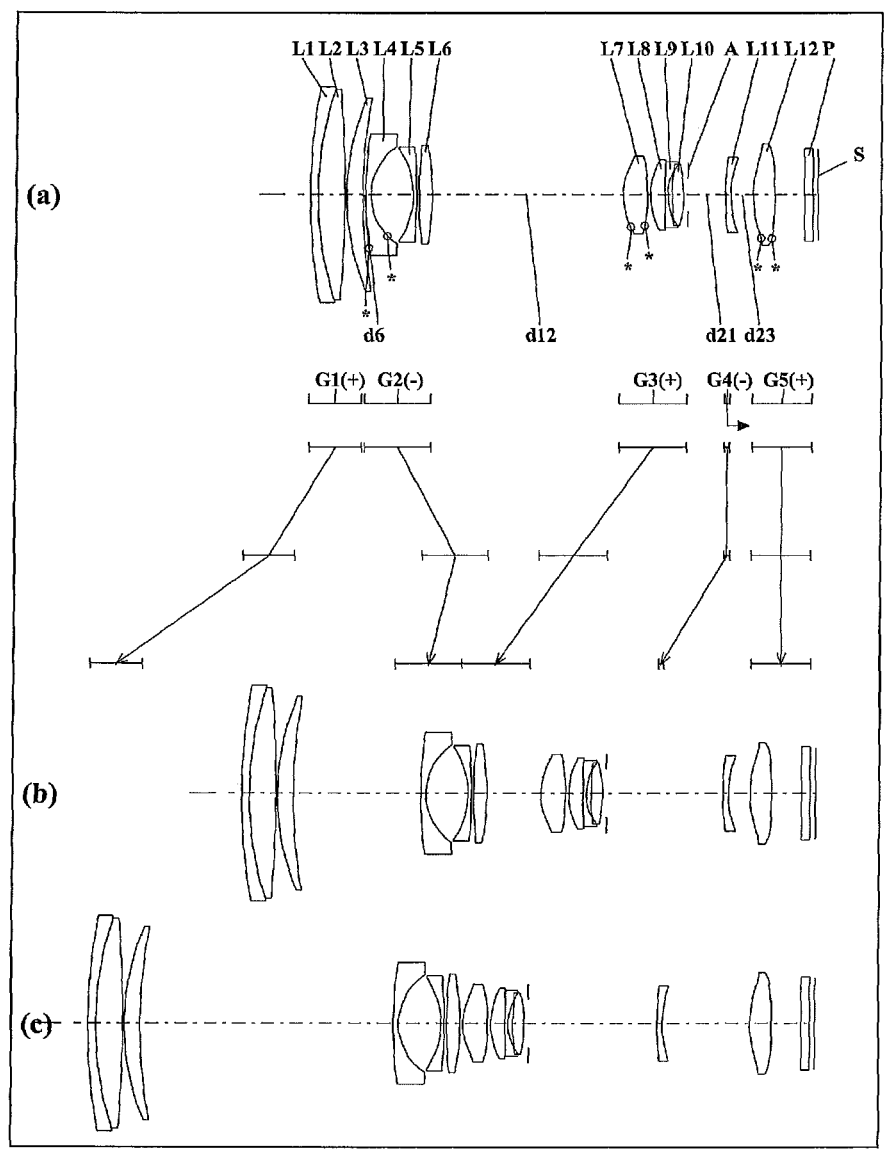
FIG. 7 is a lens arrangement diagram showing an infinity in-focus condition of a zoom lens system according to Embodiment 3 (Numerical Example 3)
Figure 8:
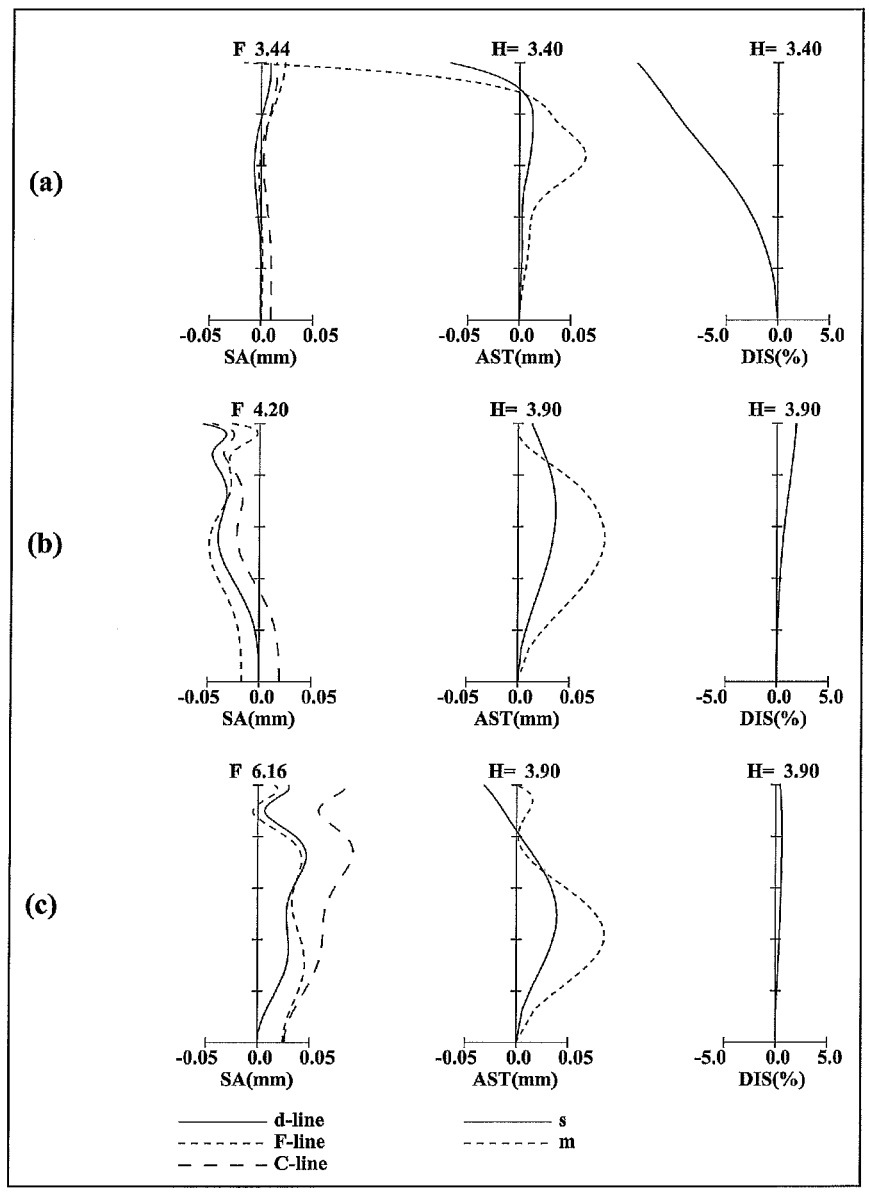
FIG. 8 is a longitudinal aberration diagram of an infinity in-focus condition of a zoom lens system according to Numerical Example 3.
Figure 9:
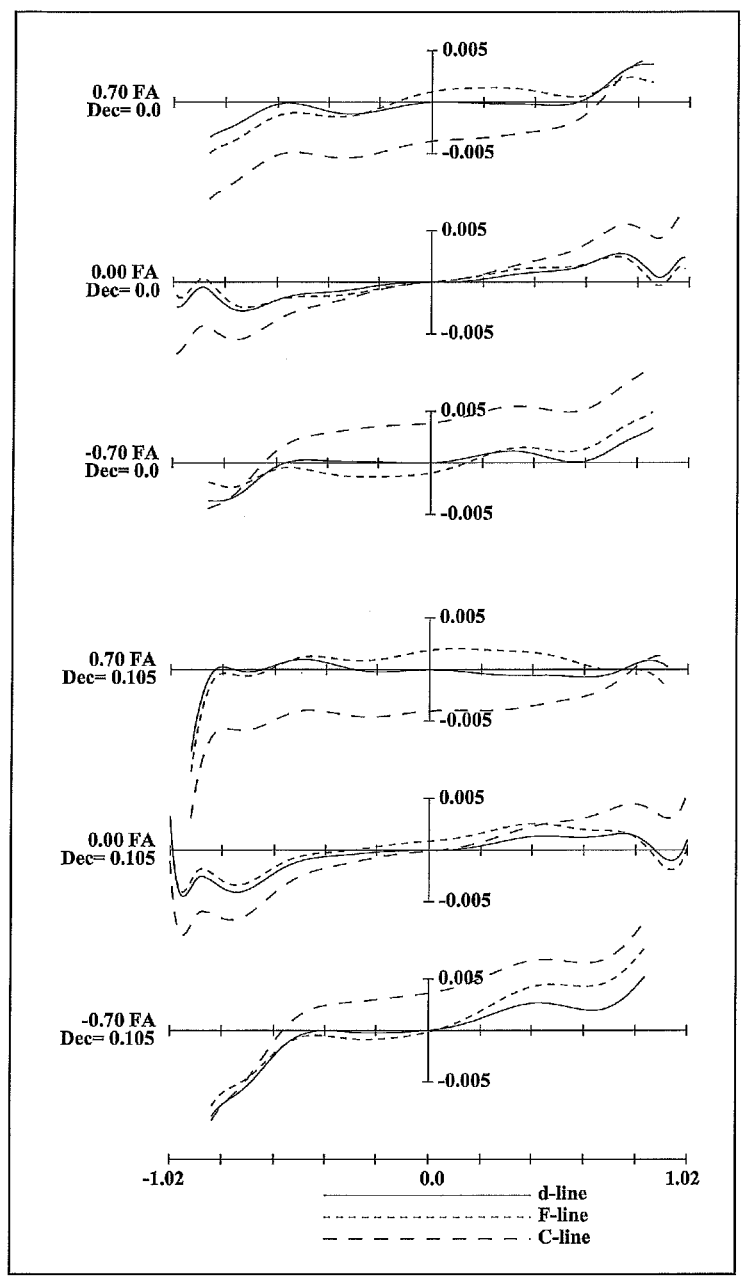
FIG. 9 is a lateral aberration diagram of a zoom lens system according to Numerical Example 3 at a telephoto limit in a basic state where image blur compensation is not performed and in an image blur compensation state.

As shown in FIG. 7, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces.

The third lens unit G3, in order from the object side to the image side, comprises: a bi-convex seventh lens element L7; a positive meniscus eighth lens element L8 with the convex surface facing the object side; a negative meniscus ninth lens element L9 with the convex surface facing the object side; and a bi-convex tenth lens element L10. Among these, the eighth lens element L8 and the ninth lens element L9 are cemented with each other. In the surface data of the corresponding Numerical Example described later, surface number 16 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 3, an aperture diaphragm A is provided between the third lens unit G3 and the fourth lens unit G4. In zooming from a wide-angle limit to a telephoto limit at the time of image taking, the aperture diaphragm A moves along the optical axis to the object side, integrally with the third lens unit G3.

In the zoom lens system according to Embodiment 3, a plane parallel plate P is provided on the object side relative to the image surface S, i.e., between the image surface S and the twelfth lens element L12.

In the zoom lens system according to Embodiment 3, in zooming from a wide-angle limit to a telephoto limit at the time of image taking, the first lens unit G1 moves nearly monotonically to the object side, the second lens unit G2 moves to the image side with locus of a convex to the image side, the third lens unit G3 moves monotonically to the object side, the fourth lens unit G4 moves to the object side with locus of a convex to the image side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 increases.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 3, in focusing from an infinity in-focus condition to a close-object in-focus condition, the fourth lens unit G4 moves along the optical axis to the image side.

Embodiment 4

Figure 10:
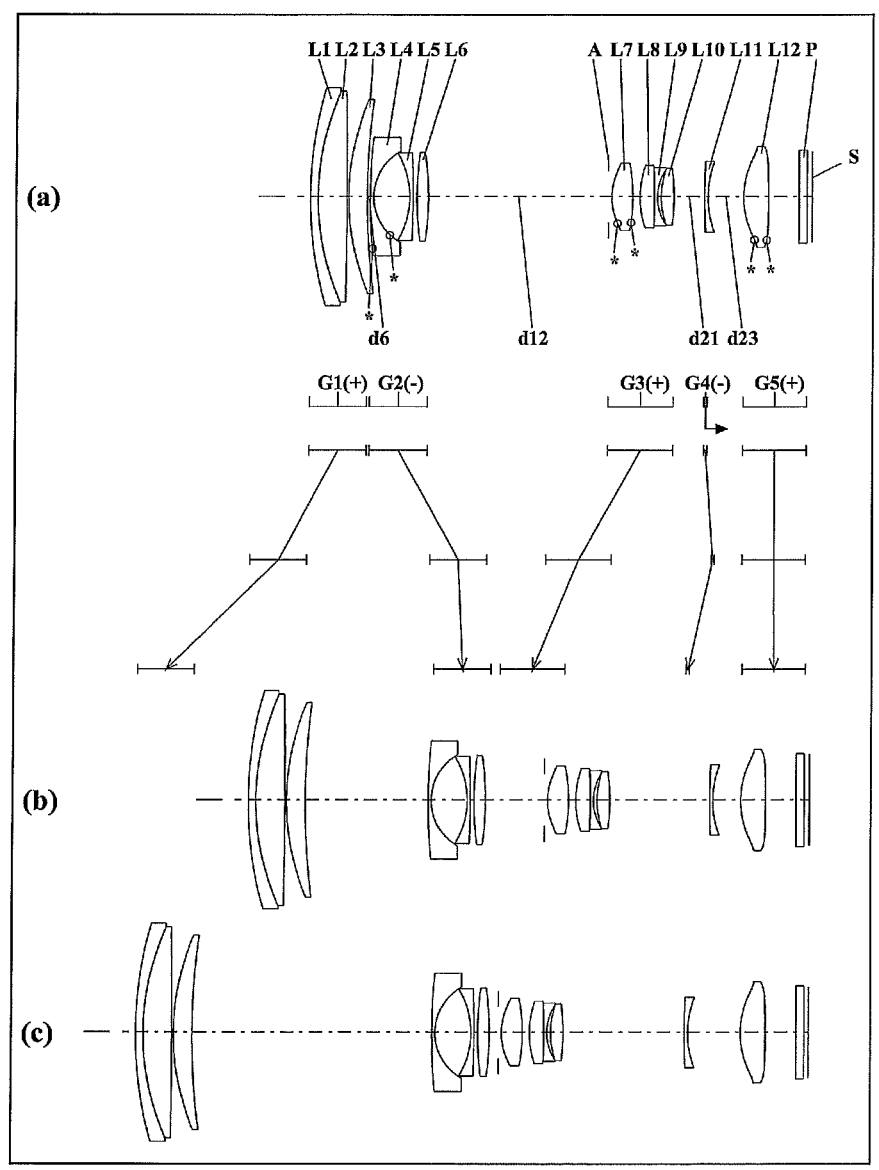
FIG. 10 is a lens arrangement diagram showing an infinity in-focus condition of a zoom lens system according to Embodiment 4 (Numerical Example 4)
Figure 11:
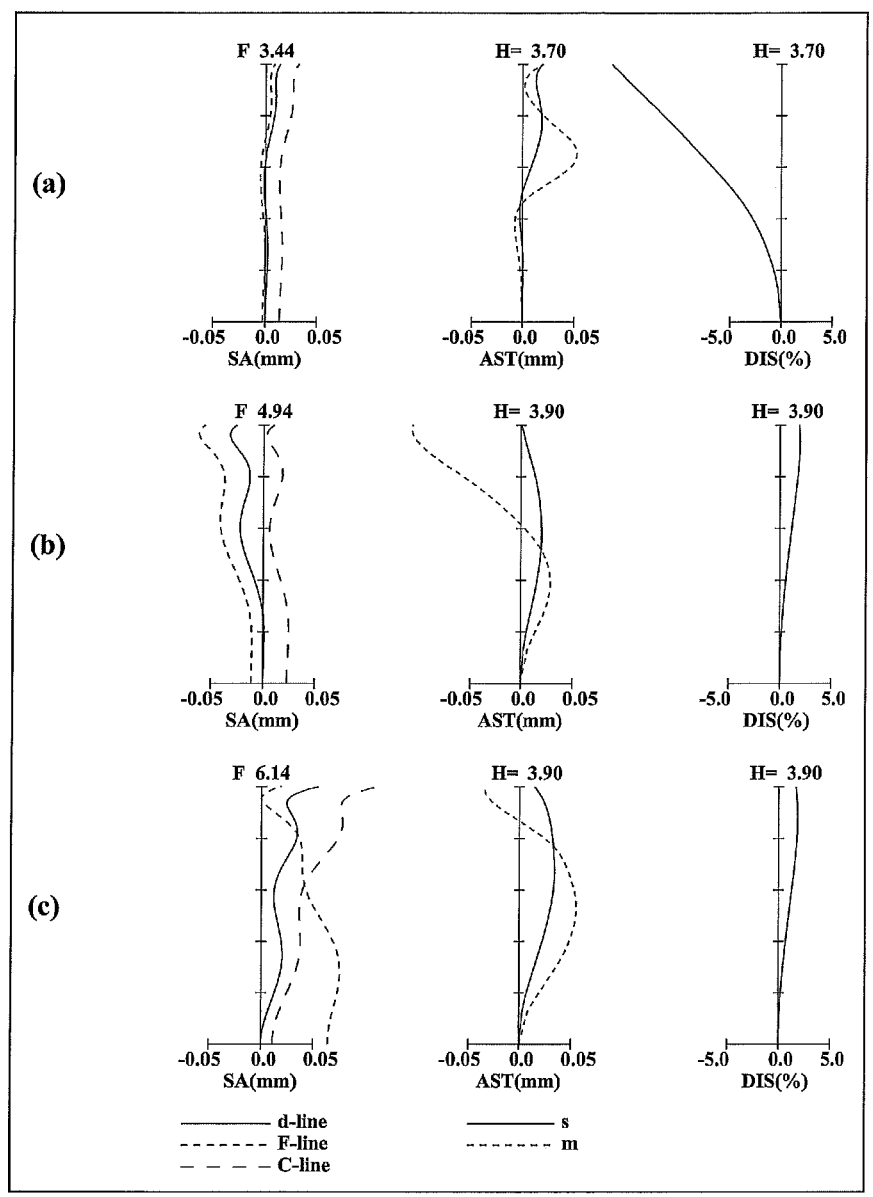
FIG. 11 is a longitudinal aberration diagram of an infinity in-focus condition of a zoom lens system according to Numerical Example 4.
Figure 12:
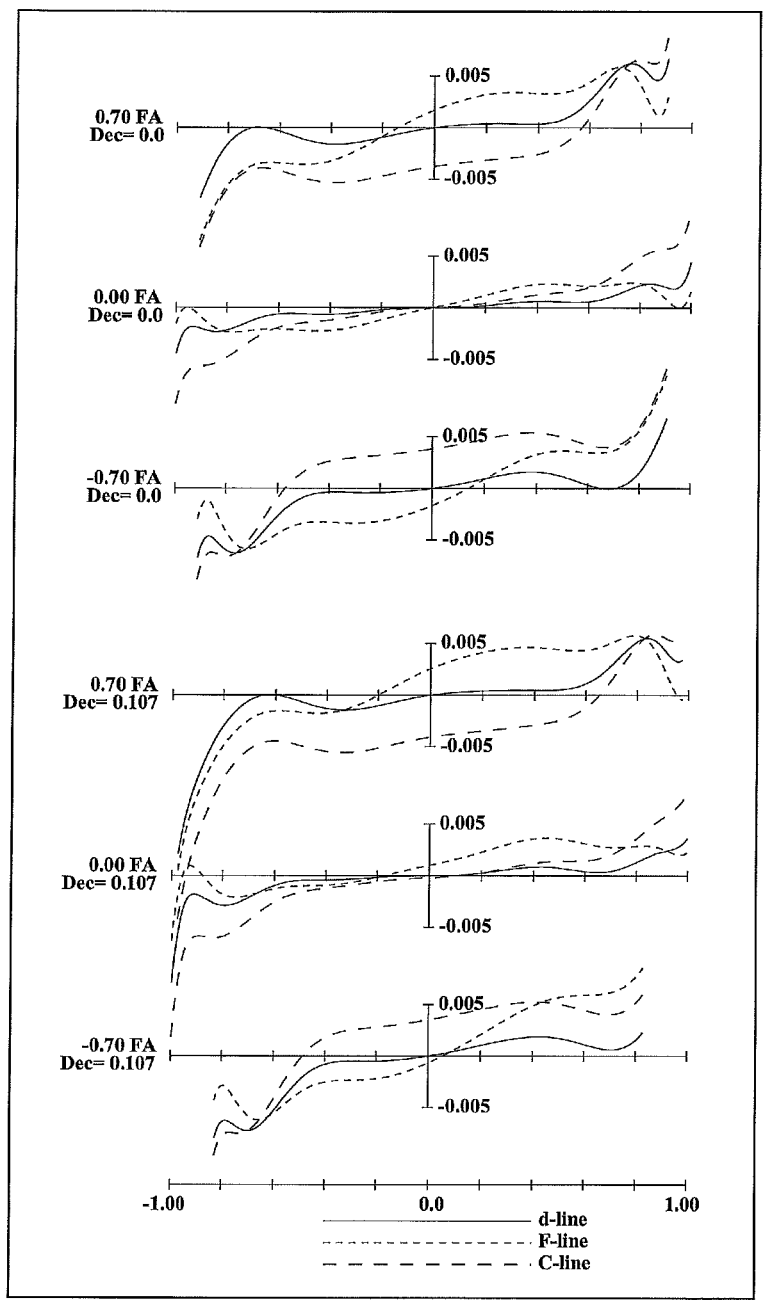
FIG. 12 is a lateral aberration diagram of a zoom lens system according to Numerical Example 4 at a telephoto limit in a basic state where image blur compensation is not performed and in an image blur compensation state.

As shown in FIG. 10, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces.

The third lens unit G3, in order from the object side to the image side, comprises: a bi-convex seventh lens element L7; a bi-convex eighth lens element L8; a bi-concave ninth lens element L9; and a bi-convex tenth lens element L10. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 4, an aperture diaphragm A is provided between the second lens unit G2 and the third lens unit G3. In zooming from a wide-angle limit to a telephoto limit at the time of image taking, the aperture diaphragm A moves along the optical axis to the object side, integrally with the third lens unit G3.

In the zoom lens system according to Embodiment 4, a plane parallel plate P is provided on the object side relative to the image surface S, i.e., between the image surface S and the twelfth lens element L12.

In the zoom lens system according to Embodiment 4, in zooming from a wide-angle limit to a telephoto limit at the time of image taking, the first lens unit G1 and the third lens unit G3 move nearly monotonically to the object side, the second lens unit G2 moves to the image side with locus of a convex to the image side, the fourth lens unit G4 moves to the object side with locus of a convex slightly to the image side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 changes.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 4, in focusing from an infinity in-focus condition to a close-object in-focus condition, the fourth lens unit G4 moves along the optical axis to the image side.

Embodiment 5

Figure 13:
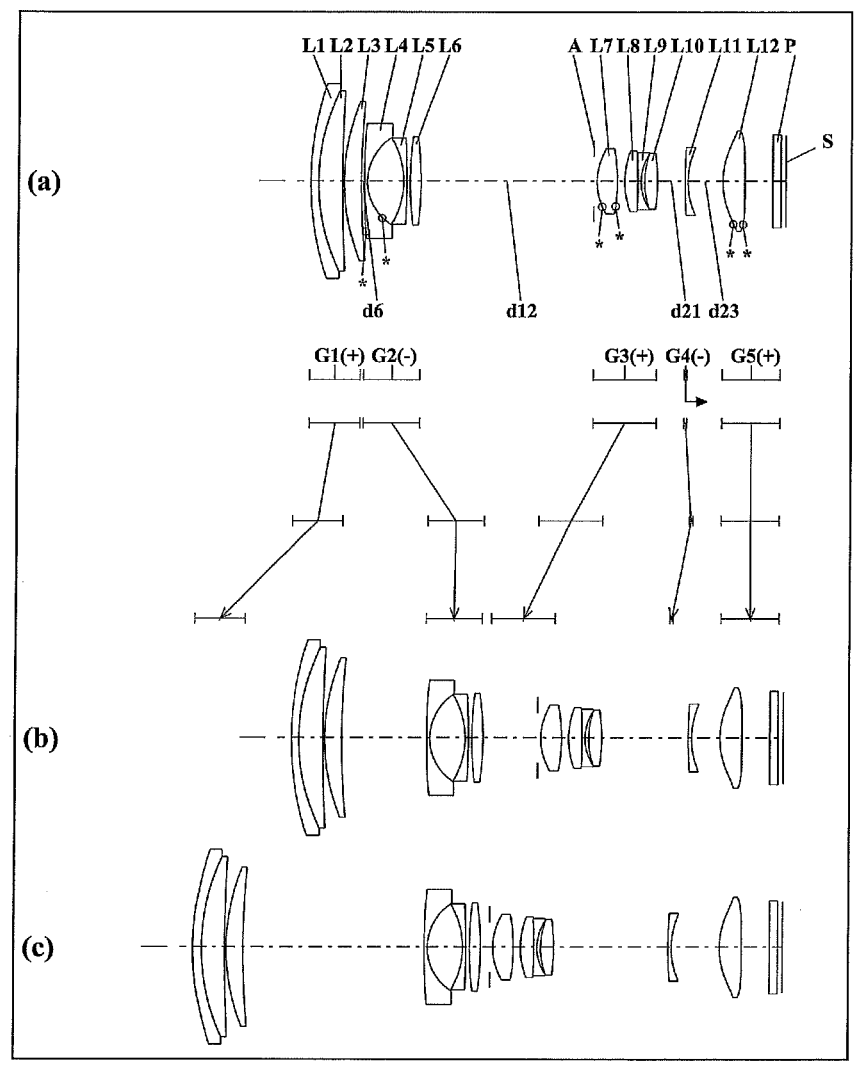
FIG. 13 is a lens arrangement diagram showing an infinity in-focus condition of a zoom lens system according to Embodiment 5 (Numerical Example 5)
Figure 14:
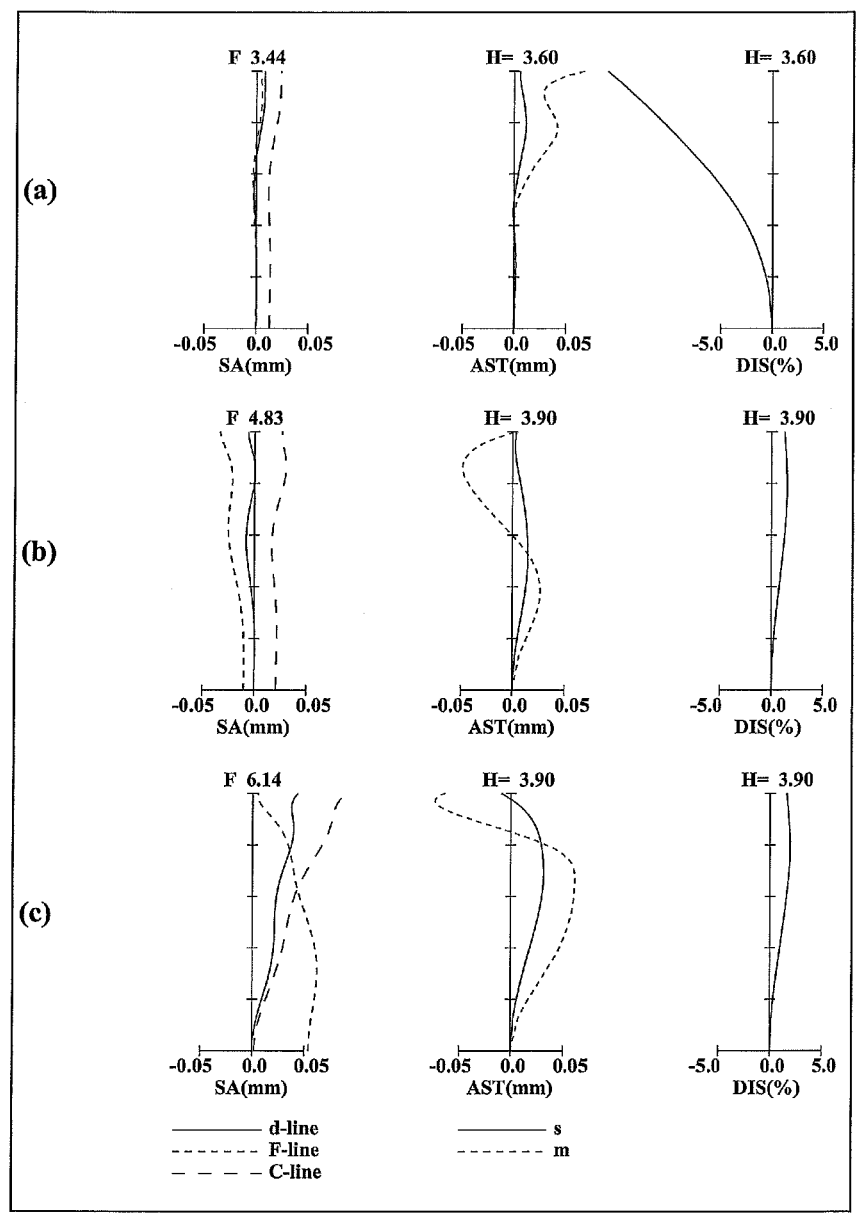
FIG. 14 is a longitudinal aberration diagram of an infinity in-focus condition of a zoom lens system according to Numerical Example 5.
Figure 15:
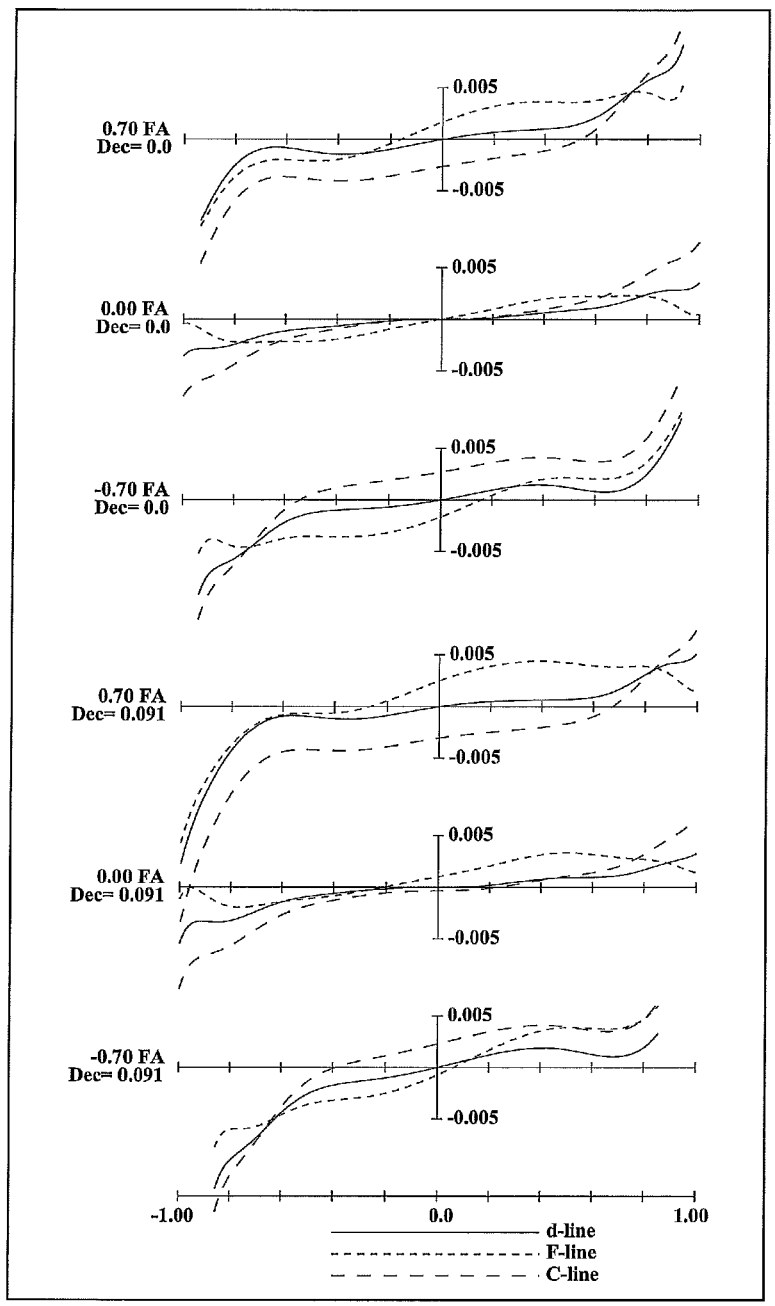
FIG. 15 is a lateral aberration diagram of a zoom lens system according to Numerical Example 5 at a telephoto limit in a basic state where image blur compensation is not performed and in an image blur compensation state.

As shown in FIG. 13, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-concave sixth lens element L6. Among these, the fourth lens element L4 has two aspheric surfaces.

The third lens unit G3, in order from the object side to the image side, comprises: a bi-convex seventh lens element L7; a bi-convex eighth lens element L8; a bi-concave ninth lens element L9; and a bi-convex tenth lens element L10. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 5, an aperture diaphragm A is provided between the second lens unit G2 and the third lens unit G3. In zooming from a wide-angle limit to a telephoto limit at the time of image taking, the aperture diaphragm A moves along the optical axis to the object side, integrally with the third lens unit G3.

In the zoom lens system according to Embodiment 5, a plane parallel plate P is provided on the object side relative to the image surface S, i.e., between the image surface S and the twelfth lens element L12.

In the zoom lens system according to Embodiment 5, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves nearly monotonically to the object side, the fourth lens unit G4 moves to the object side with locus of a convex slightly to the image side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 changes.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 5, in focusing from an infinity in-focus condition to a close-object in-focus condition, the fourth lens unit G4 moves along the optical axis to the image side.

Embodiment 6

Figure 16:
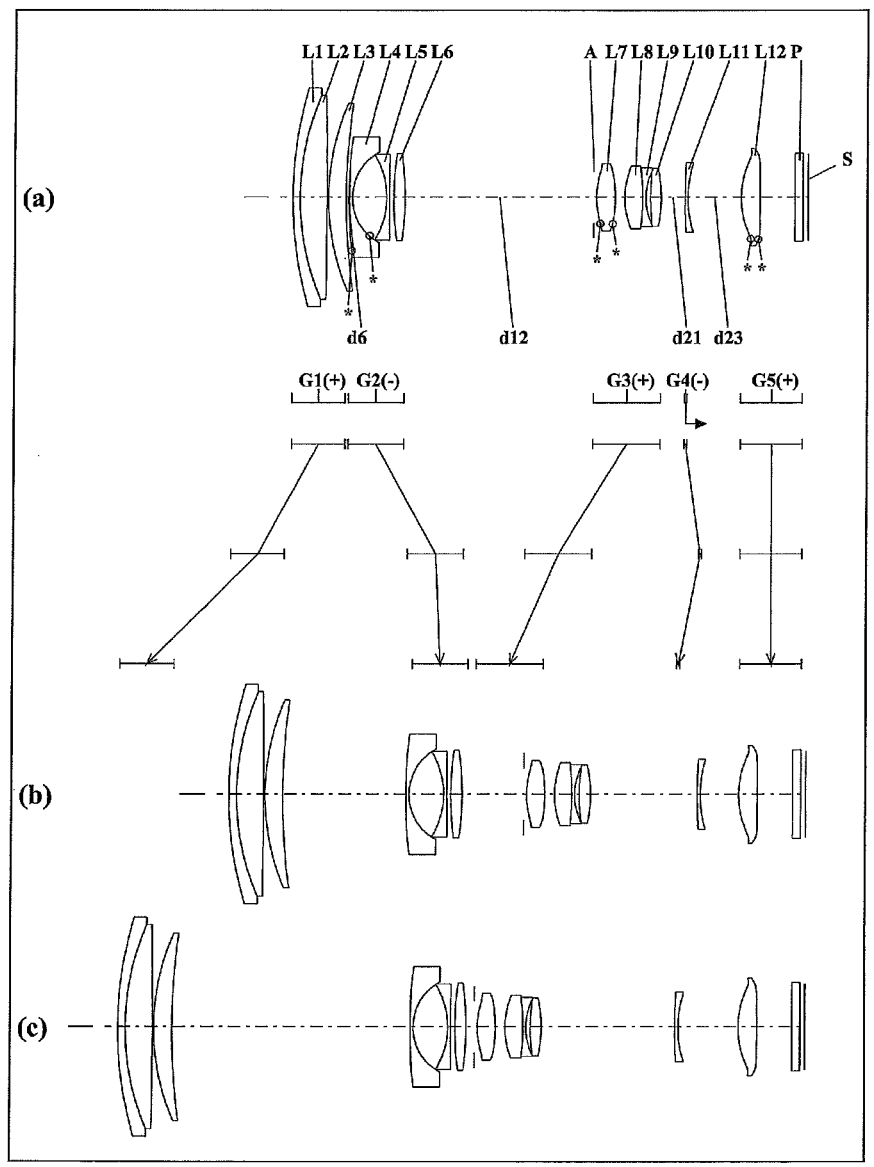
FIG. 16 is a lens arrangement diagram showing an infinity in-focus condition of a zoom lens system according to Embodiment 6 (Numerical Example 6)
Figure 17:
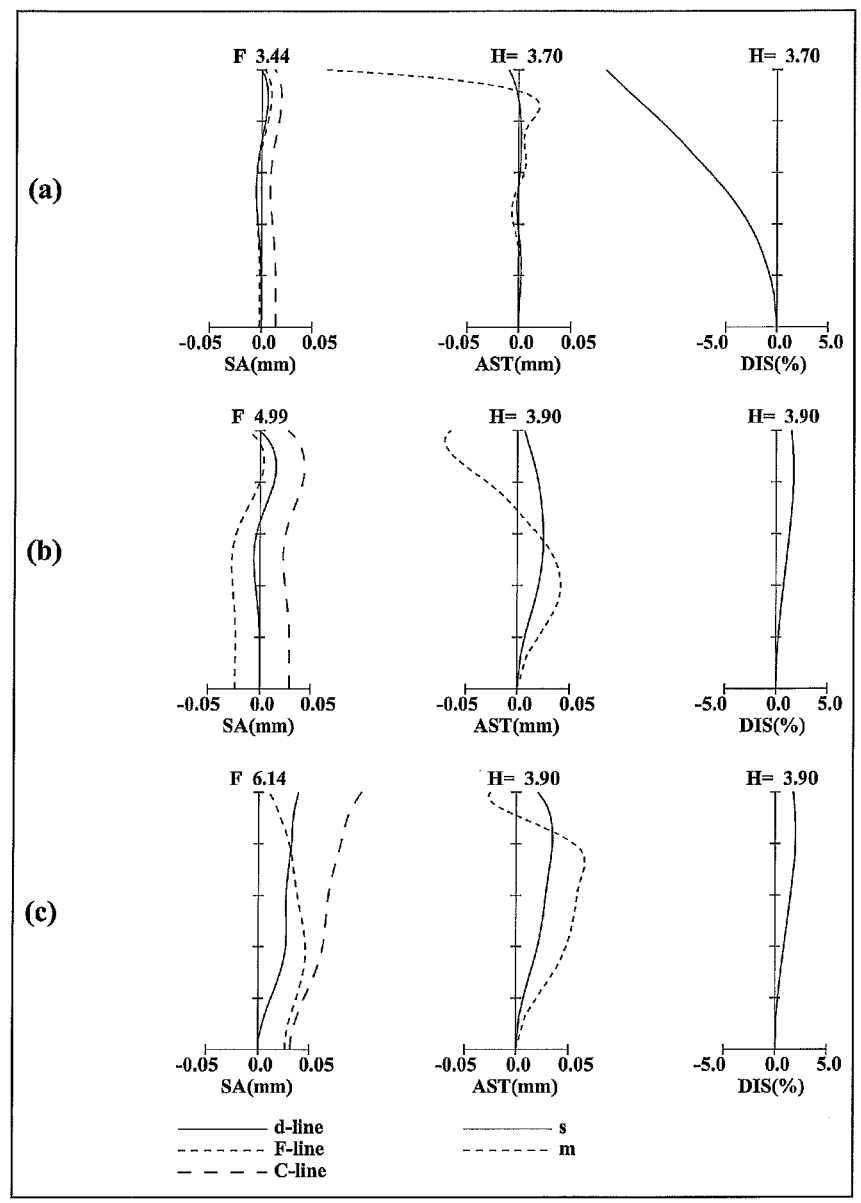
FIG. 17 is a longitudinal aberration diagram of an infinity in-focus condition of a zoom lens system according to Numerical Example 6.
Figure 18:
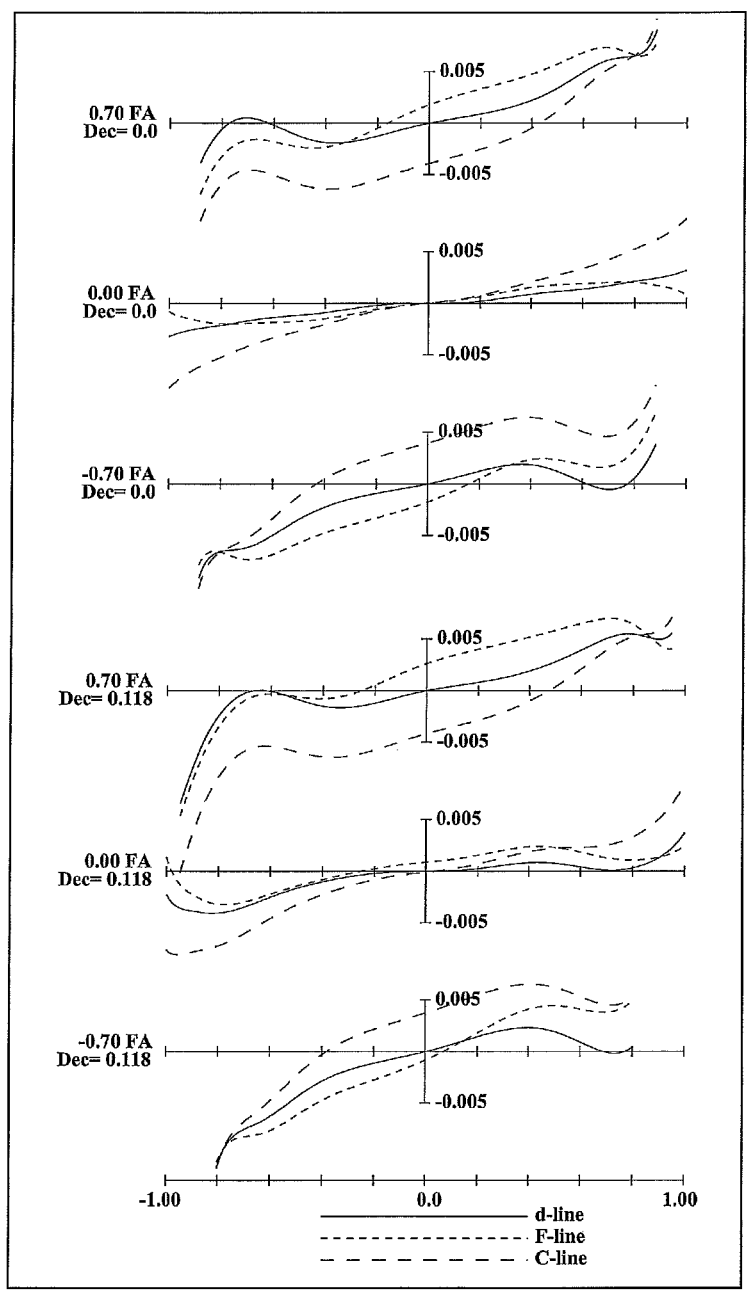
FIG. 18 is a lateral aberration diagram of a zoom lens system according to Numerical Example 6 at a telephoto limit in a basic state where image blur compensation is not performed and in an image blur compensation state.

As shown in FIG. 16, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces.

The third lens unit G3, in order from the object side to the image side, comprises: a bi-convex seventh lens element L7; a bi-convex eighth lens element L8; a bi-concave ninth lens element L9; and a bi-convex tenth lens element L10. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a bi-convex twelfth lens element L12. The twelfth lens element L12 has two aspheric surfaces.

In the zoom lens system according to Embodiment 6, an aperture diaphragm A is provided between the second lens unit G2 and the third lens unit G3. In zooming from a wide-angle limit to a telephoto limit at the time of image taking, the aperture diaphragm A moves along the optical axis to the object side, integrally with the third lens unit G3.

In the zoom lens system according to Embodiment 6, a plane parallel plate P is provided on the object side relative to the image surface S, i.e., between the image surface S and the twelfth lens element L12.

In the zoom lens system according to Embodiment 6, in zooming from a wide-angle limit to a telephoto limit at the time of image taking, the first lens unit G1 and the third lens unit G3 move nearly monotonically to the object side, the second lens unit G2 moves to the image side with locus of a convex slightly to the image side, the fourth lens unit G4 moves to the object side with locus of a convex slightly to the image side, and the fifth lens unit G5 is fixed with respect to the image surface S. That is, in zooming, the first lens unit G1, the second lens unit G2, the third lens unit G3, and the fourth lens unit G4 move along the optical axis such that the interval between the first lens unit G1 and the second lens unit G2 increases, the interval between the second lens unit G2 and the third lens unit G3 decreases, the interval between the third lens unit G3 and the fourth lens unit G4 changes, and the interval between the fourth lens unit G4 and the fifth lens unit G5 changes.

As described above, the fifth lens unit G5 is a lens unit that does not move along the optical axis at the time of zooming but moves along the optical axis at the time of transition from the imaging state to the accommodated state, and corresponds to a lens unit α which is one of subsequent lens units described later.

In the zoom lens system according to Embodiment 6, in focusing from an infinity in-focus condition to a close-object in-focus condition, the fourth lens unit G4 moves along the optical axis to the image side.

Embodiment 7

As shown in FIG. 19, the first lens unit G1, in order from the object side to the image side, comprises: a negative meniscus first lens element L1 with the convex surface facing the object side; and a positive meniscus second lens element L2 with the convex surface facing the object side. Among these, the first lens element L1 has two aspheric surfaces.

The second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-concave sixth lens element L6. Among these, the fourth lens element L4 and the fifth lens element L5 are cemented with each other. In the surface data of the corresponding Numerical Example described later, surface number 8 is imparted to an adhesive layer between the fourth lens element L4 and the fifth lens element L5. Further, the third lens element L3 has an aspheric object side surface.

The third lens unit G3 comprises solely a positive meniscus seventh lens element L7 with the convex surface facing the image side.

The fourth lens unit G4 comprises solely a bi-convex eighth lens element L8. The eighth lens element L8 has an aspheric image side surface.

In the zoom lens system according to Embodiment 7, an aperture diaphragm A is provided between the second lens unit G2 and the third lens unit G3. In zooming from a wide-angle limit to a telephoto limit at the time of image taking, the aperture diaphragm A moves along the optical axis to the object side, integrally with the second lens unit G2.

In the zoom lens system according to Embodiment 7, a plane parallel plate P is provided on the object side relative to the image surface S, i.e., between the image surface S and the eighth lens element L8.

In the zoom lens system according to Embodiment 7, in zooming from a wide-angle limit to a telephoto limit at the time of image taking, the first lens unit G1 moves to the object side with locus of a convex to the image side, the second lens unit G2 moves nearly monotonically to the object side, the third lens unit G3 moves to the image side with locus of a convex to the object side, and the fourth lens unit G4 is fixed with respect to the image surface S. That is, in zooming, the first lens unit G1, the second lens unit G2, and the third lens unit G3 move along the optical axis such that the interval between the first lens unit G1 and the second lens unit G2 decreases, the interval between the second lens unit G2 and the third lens unit G3 increases, and the interval between the third lens unit G3 and the fourth lens unit G4 changes.

As described above, the fourth lens unit G4 corresponds to a lens unit that does not move along the optical axis at the time of zooming but moves along the optical axis at the time of transition from the imaging state to the accommodated state.

In the zoom lens system according to Embodiment 7, in focusing from an infinity in-focus condition to a close-object in-focus condition, the third lens unit G3 moves along the optical axis to the object side.

In the zoom lens systems according to Embodiments 1 to 6, the fifth lens unit G5 corresponds to the lens unit α that is one of the subsequent lens units located on the image side relative to the second lens unit G2, and does not move along the optical axis in zooming from a wide-angle limit to a telephoto limit at the time of image taking, but moves along the optical axis at the time of transition from the imaging state to the accommodated state. In the zoom lens system according to Embodiment 7, the fourth lens unit G4 does not move along the optical axis in zooming from a wide-angle limit to a telephoto limit at the time of image taking, but moves along the optical axis at the time of transition from the imaging state to the accommodated state. Accordingly, aberrations can be successfully compensated, and the size of the entire lens system can be reduced while maintaining high optical performance and a high zooming ratio.

In the zoom lens systems according to Embodiments 1 to 6, the fifth lens unit G5 located closest to the image side corresponds to the lens unit α that does not move along the optical axis in zooming from a wide-angle limit to a telephoto limit at the time of image taking, but moves along the optical axis at the time of transition from the imaging state to the accommodated state. In the zoom lens system according to Embodiment 7, the fourth lens unit G4 located closest to the image side does not move along the optical axis in zooming from a wide-angle limit to a telephoto limit at the time of image taking, but moves along the optical axis at the time of transition from the imaging state to the accommodated state. Accordingly, it is possible to avoid a complicated configuration caused by a lens unit provided between the image surface and the fifth lens unit G5 or the fourth lens unit G4.

In the zoom lens systems according to Embodiments 1 to 7, since the fourth lens unit G4 is composed of one lens element, reduction in the size of the entire lens system is achieved. Further, in the zoom lens systems according to Embodiments 1 to 6, rapid focusing from an infinity in-focus condition to a close-object in-focus condition is easily achieved.

In the zoom lens systems according to Embodiments 1 to 6, since the fifth lens unit G5 is composed of one lens element, reduction in the size of the entire lens system is achieved.

In the zoom lens systems according to Embodiments 1 to 6, in focusing from an infinity in-focus condition to a close-object in-focus condition, the fourth lens unit G4 moves along the optical axis. Therefore, high optical performance can be maintained even in the close-object in-focus condition.

The zoom lens systems according to Embodiments 1 to 6 each have a five-unit configuration, and the zoom lens system according to Embodiment 7 has a four-unit configuration. However, the number of lens units constituting each lens system is not particularly limited as long as it is not less than three. Further, the optical powers of the lens units constituting each lens system are not particularly limited.

Any lens unit among the first to fifth lens units G1 to G5 or a sub lens unit corresponding to a part of each lens unit in the zoom lens systems according to Embodiments 1 to 6, or any lens unit among the first to fourth lens units G1 to G4 or a sub lens unit corresponding to a part of each lens unit in the zoom lens system according to Embodiment 7, may be moved in a direction perpendicular to the optical axis. Thereby, movement of an image point caused by vibration of the entire system can be compensated, that is, image blur caused by hand blurring, vibration and the like can be optically compensated.

When compensating the movement of the image point caused by vibration of the entire system, for example, the third lens unit G3 may be moved in the direction perpendicular to the optical axis in the zoom lens systems according to Embodiments 1 to 6, or the second lens unit G2 may be moved in the direction perpendicular to the optical axis in the zoom lens system according to Embodiment 7. Thereby, image blur can be compensated in a state that size increase in the entire zoom lens system is suppressed to realize a compact configuration and that excellent imaging characteristics such as small decentering coma aberration and small decentering astigmatism are satisfied.

In a case where a lens unit is composed of a plurality of lens elements, the above-mentioned sub lens unit corresponding to a part of each lens unit indicates any one lens element or a plurality of adjacent lens elements among the plurality of lens elements.

As described above, Embodiments 1 to 7 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions to be satisfied by a zoom lens system like the zoom lens systems according to Embodiments 1 to 7. Here, a plurality of beneficial conditions is set forth for the zoom lens system according to each embodiment. A construction that satisfies all the plural conditions is most beneficial for the zoom lens system. However, when an individual condition is satisfied, a zoom lens system having the corresponding effect is obtained.

For example, in a zoom lens system, like the zoom lens systems according to Embodiments 1 to 6, which, in order from the object side to the image side, comprises: a first lens unit having positive optical power; a second lens unit having negative optical power; a third lens unit having positive optical power; and one or more subsequent lens units, wherein, in zooming from a wide-angle limit to a telephoto limit at the time of image taking, the first lens unit, the second lens unit, and the third lens unit are moved along the optical axis to perform magnification change, and the lens unit α which is one of the subsequent lens units does not move along the optical axis at the time of the zooming but moves along the optical axis at the time of transition from the imaging state to the accommodated state, the following conditions (1), (2-1) and (a) are satisfied. Hereinafter, the lens configuration of this zoom lens system is referred to as a basic configuration I of the embodiment.

$$0.8 < L_T/f_T < 1.2 \tag{1}$$

$$0.12 < D_\alpha/f_{G\alpha} < 0.30 \tag{2-1}$$

$$f_T/f_W > 9.0 \tag{a}$$

where, $L_T$ is an overall length of lens system (a distance from a most object side surface of the first lens unit to an image surface) at a telephoto limit, $D_\alpha$ is an axial air-equivalent length between a most image side surface of the lens unit α and the image surface, $f_{G\alpha}$ is a composite focal length of the lens unit α, $f_W$ is a focal length of the entire system at a wide-angle limit, and $f_T$ is a focal length of the entire system at a telephoto limit.

The condition (a) sets forth the ratio between the focal length of the entire system at a wide-angle limit and the focal length of the entire system at a telephoto limit. The zoom lens system having the basic configuration I satisfies the condition (a), and therefore, has a high zooming ratio, and ensures high magnification.

The condition (1) sets forth the ratio between the overall length of lens system at a telephoto limit and the focal length of the entire system at a telephoto limit. When the value goes below the lower limit of the condition (1), the overall length of lens system at a telephoto limit becomes excessively short, and the focal length of each lens unit becomes excessively short. Thereby, aberration fluctuation at the time of magnification change increases, which causes difficulty in compensating aberrations. When the value exceeds the upper limit of the condition (1), the overall length of lens system at a telephoto limit becomes excessively long, which causes difficulty in providing compact lens barrels, imaging devices, and cameras.

When the following condition (1)' is satisfied, the above-mentioned effect is achieved more successfully.

$$0.9 < L_T/f_T \tag{1)'}$$

It is beneficial that the conditions (1) and (1)' are satisfied under the following condition (a)'.

$$f_T/f_W > 13.0 \tag{a)'}$$

The condition (2-1) sets forth the ratio between the axial air-equivalent length between the most image side surface of the lens unit α and the image surface, and the focal length of the lens unit α. When the value goes below the lower limit of the condition (2-1), the axial air-equivalent length between the most image side surface of the lens unit α and the image surface becomes excessively short, and aberration fluctuation increases, which causes difficulty in compensating aberrations, particularly, curvature of field. When the value exceeds the upper limit of the condition (2-1), the axial air-equivalent length between the most image side surface of the lens unit α and the image surface becomes excessively long, and the overall length of lens system increases, which causes difficulty in providing compact lens barrels, imaging devices, and cameras.

When the following condition (2-1)' is satisfied, the above-mentioned effect is achieved more successfully.

$$0.17 < D_\alpha/f_{G\alpha} \tag{2-1)'}$$

It is beneficial that the conditions (2-1) and (2-1)' are satisfied under the above condition (a)'.

For example, in a zoom lens system having the basic configuration I like the zoom lens systems according to Embodiments 1 to 6, it is beneficial that the following condition (3) is satisfied.

$$-7.0 > f_1/f_2 < -4.0 \tag{3}$$

where, $f_1$ is a composite focal length of the first lens unit, and $f_2$ is a composite focal length of the second lens unit.

The condition (3) sets forth the ratio between the focal length of the first lens unit and the focal length of the second lens unit. When the value goes below the lower limit of the condition (3), the focal length of the second lens unit becomes excessively short, and aberration fluctuation at the time of magnification change increases, which causes difficulty in compensating aberrations. Further, the focal length of the first lens unit becomes excessively long, and the amount of movement of the first lens unit, which is desired for securing high magnification, becomes excessively great, which causes difficulty in providing compact lens barrels, imaging devices, and cameras. When the value exceeds the upper limit of the condition (3), the focal length of the first lens unit becomes excessively short, and aberration fluctuation at the time of magnification change increases, which causes difficulty in compensating aberrations. In addition, the diameter of the first lens unit increases, which causes difficulty in providing compact lens barrels, imaging devices, and cameras. Further, error sensitivity to inclination of the first lens unit becomes excessively high, which may cause difficulty in assembling optical systems.

It is beneficial that the condition (3) is satisfied under the above condition (a)'.

For example, in a zoom lens system having the basic configuration I like the zoom lens systems according to Embodiments 1 to 6, it is beneficial that the following condition (4) is satisfied.

$$0.5 < |f_1/f_4| < 4.2 \quad (4)$$

where, $f_1$ is a composite focal length of the first lens unit, and
$f_4$ is a composite focal length of the fourth lens unit.

The condition (4) sets forth the ratio between the focal length of the first lens unit and the focal length of the fourth lens unit. When the value goes below the lower limit of the condition (4), the focal length of the fourth lens unit becomes excessively long, and the amount of movement of the fourth lens unit becomes excessively great, which causes difficulty in providing compact lens barrels, imaging devices, and cameras. Further, the focal length of the first lens unit becomes excessively short, and aberration fluctuation at the time of magnification change increases, which causes difficulty in compensating aberrations. In addition, the diameter of the first lens unit increases, which causes difficulty in providing compact lens barrels, imaging devices, and cameras. Further, error sensitivity to inclination of the first lens unit becomes excessively high, which may cause difficulty in assembling optical systems. When the value exceeds the upper limit of the condition (4), the focal length of the first lens unit becomes excessively long, and the amount of movement of the first lens unit, which is desired for securing high magnification, becomes excessively great, which causes difficulty in providing compact lens barrels, imaging devices, and cameras.

When at least one of the following conditions (4)' and (4)" is satisfied, the above-mentioned effect is achieved more successfully.

$$1.5 < |f_1/f_4| \quad (4)'$$

$$|f_1/f_4| < 3.0 \quad (4)''$$

It is beneficial that the conditions (4), (4)', and (4)" are satisfied under the above condition (a)'.

For example, in a zoom lens system, like the zoom lens system according to Embodiment 7, which, in order from the object side to the image side, comprises: a first lens unit having negative optical power; a second lens unit having positive optical power; and one or more subsequent lens units, wherein, in zooming from a wide-angle limit to a telephoto limit at the time of image taking, the first lens unit and the second lens unit are moved along the optical axis to perform magnification change, and one of the subsequent lens units does not move along the optical axis at the time of the zooming but moves along the optical axis at the time of transition from the imaging state to the accommodated state, the following condition (2-2) is satisfied. Hereinafter, the lens configuration of this zoom lens system is referred to as a basic configuration II of the embodiment.

$$0.12 < D_\beta/f_{G\beta} < 0.29 \quad (2-2)$$

where, $D_\beta$ is an axial air-equivalent length between an image surface and a most image side surface of a lens unit that moves along the optical axis at the time of transition from the imaging state to the accommodated state, and $f_{G\beta}$ is a composite focal length of the lens unit that moves along the optical axis at the time of transition from the imaging state to the accommodated state.

The condition (2-2) sets forth the ratio between the axial air-equivalent length between the image surface and the most image side surface of the lens unit that moves along the optical axis at the time of transition from the imaging state to the accommodated state, and the focal length of the lens unit that moves along the optical axis at the time of transition from the imaging state to the accommodated state. When the value goes below the lower limit of the condition (2-2), the axial air-equivalent length between the image surface and the most image side surface of the lens unit that moves along the optical axis at the time of transition from the imaging state to the accommodated state becomes excessively short, and aberration fluctuation increases, which causes difficulty in compensating aberrations, particularly, curvature of field. When the value exceeds the upper limit of the condition (2-2), the axial air-equivalent length between the image surface and the most image side surface of the lens unit that moves along the optical axis at the time of transition from the imaging state to the accommodated state becomes excessively long, and the overall length of lens system increases, which causes difficulty in providing compact lens barrels, imaging devices, and cameras.

Each of the lens units constituting the zoom lens systems according to Embodiments 1 to 7 is composed exclusively of refractive type lens elements that deflect the incident light by refraction, i.e., lens elements of a type in which deflection is achieved at the interface between media each having a distinct refractive index. However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved. Thus, such a configuration is beneficial.

Moreover, in each embodiment, a configuration has been described that on the object side relative to the image surface S, i.e., between the image surface S and the most image side lens surface of the fifth lens unit G5 in Embodiments 1 to 6, or between the image surface S and the most image side lens surface of the fourth lens unit G4 in Embodiment 7, a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves desired characteristics of optical cut-off frequency by diffraction.

Embodiment 8

Figure 22:
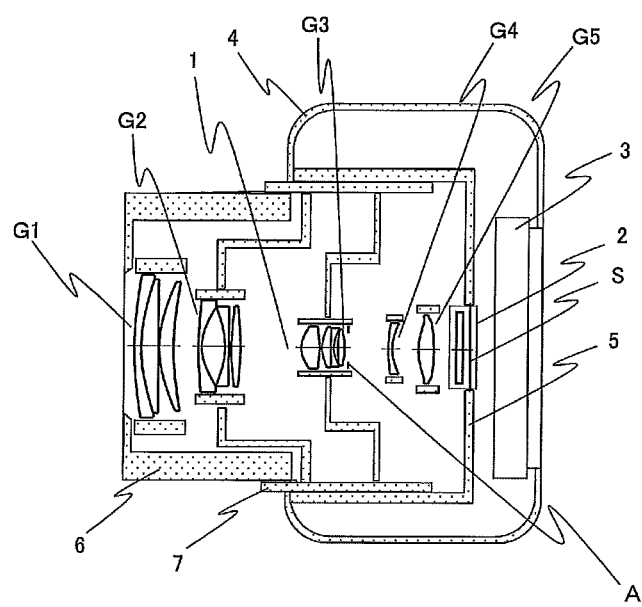
FIG. 22 is a schematic configuration diagram of a digital still camera according to Embodiment 8.

FIG. 22 is a schematic configuration diagram of a digital still camera according to Embodiment 8. In FIG. 22, the digital still camera comprises: an imaging device having a zoom lens system 1 and an image sensor 2 that is a CCD; a liquid crystal display monitor 3; and a body 4. A zoom lens system according to Embodiment 1 is employed as the zoom lens system 1. In FIG. 22, the zoom lens system 1 comprises a first lens unit G1, a second lens unit G2, a third lens unit G3, an aperture diaphragm A, a fourth lens unit G4, and a fifth lens unit G5. In the body 4, the zoom lens system 1 is arranged on the front side, and the image sensor 2 is arranged on the rear side of the zoom lens system 1. On the rear side of the body 4, the liquid crystal display monitor 3 is arranged, and an optical image of a photographic object generated by the zoom lens system 1 is formed on an image surface S.

A lens barrel comprises a main barrel 5, a moving barrel 6, and a cylindrical cam 7. When the cylindrical cam 7 is rotated, the first lens unit G1, the second lens unit G2, the third lens unit G3 and the aperture diaphragm A, the fourth lens unit G4, and the fifth lens unit G5 move to predetermined positions relative to the image sensor 2, so that zooming from a wide-angle limit to a telephoto limit is achieved. The fourth lens unit G4 is movable in the optical axis direction by a motor for focus adjustment.

As such, when the zoom lens system according to Embodiment 1 is employed in a digital still camera, a small digital still camera can be obtained that has a high resolution and high capability of compensating curvature of field and that has a short overall length of lens system at the time of non-use. In the digital still camera shown in FIG. 22, any one of the zoom lens systems according to Embodiments 2 to 7 may be employed in place of the zoom lens system according to Embodiment 1. Further, the optical system of the digital still camera shown in FIG. 22 is applicable also to a digital video camera for moving images. In this case, moving images with high resolution can be acquired in addition to still images.

The digital still camera according to Embodiment 8 has been described for a case that the employed zoom lens system 1 is any one of the zoom lens systems according to Embodiments 1 to 7. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 7.

Further, Embodiment 8 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 8, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

An imaging device comprising any one of the zoom lens systems according to Embodiments 1 to 7, and an image sensor such as a CCD or a CMOS may be applied to a mobile terminal device such as a smart-phone, a Personal Digital Assistance, a surveillance camera in a surveillance system, a Web camera, a vehicle-mounted camera or the like.

As described above, Embodiment 8 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 7 are implemented. In the numerical examples, the units of the length in the tables are all "mm", while the units of the view angle in the tables are all "°". In the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + A4h^4 + A6h^6 + A8h^8 + A10h^{10} + A12h^{12} + A14h^{14} + A16h^{16}$$

Here, κ is the conic constant, A4, A6, A8, A10, A12, A14 and A16 are a fourth-order, sixth-order, eighth-order, tenth-order, twelfth-order, fourteenth-order and sixteenth-order aspherical coefficients, respectively.

FIGS. 2, 5, 8, 11, 14, 17 and 20 are longitudinal aberration diagrams of the zoom lens systems according to Numerical Examples 1 to 7, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration, the astigmatism and the distortion. In each Fig., the spherical aberration is indicated as "SA(mm)", the astigmatism is indicated as "AST(mm)", and the distortion is indicated as "DIS (%)". In each spherical aberration diagram, the vertical axis indicates the F-number, and the solid line, the short dash line and the long dash line indicate the characteristics to the d-line having a wavelength of 587.56 nm, the F-line having a wavelength of 486.13 nm and the C-line having a wavelength of 656.28 nm, respectively. In each astigmatism diagram, the vertical axis indicates the image height, and the solid line and the dash line indicate the characteristics to the sagittal plane and the meridional plane, respectively. In each distortion diagram, the vertical axis indicates the image height. In each Fig., the F-number is indicated as "F", the image height is indicated as "H", the sagittal plane is indicated as "s", and the meridional plane is indicated as "m".

FIGS. 3, 6, 9, 12, 15, 18 and 21 are lateral aberration diagrams of the zoom lens systems at a telephoto limit according to Numerical Examples 1 to 7, respectively.

Figure 21:
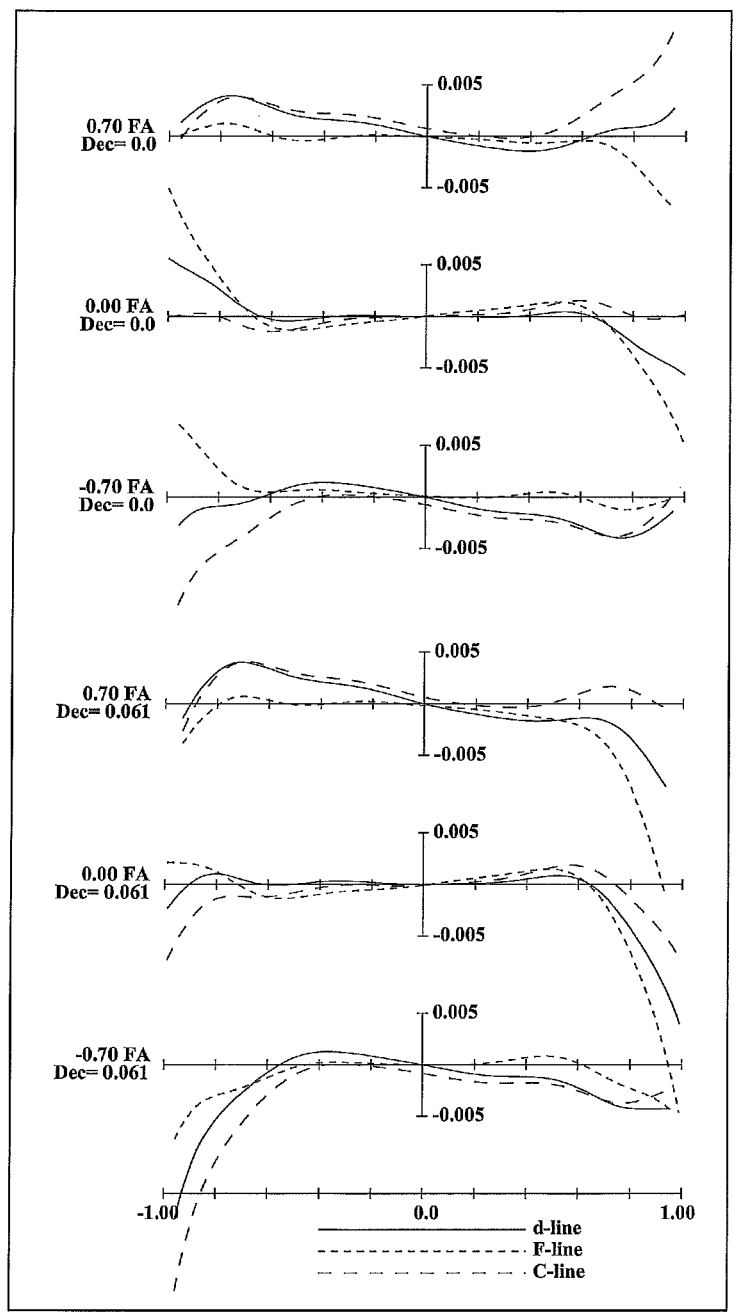
FIG. 21 is a lateral aberration diagram of a zoom lens system according to Numerical Example 7 at a telephoto limit in a basic state where image blur compensation is not performed and in an image blur compensation state.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the third lens unit G3 is moved by a predetermined amount in a direction perpendicular to the optical axis at a telephoto limit in FIGS. 3, 6, 9, 12, 15 and 18, or the entirety of the second lens unit G2 is moved by a predetermined amount in a direction perpendicular to the optical axis at a telephoto limit in FIG. 21. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram shown in FIGS. 3, 6, 9, 12, 15 and 18, the meridional plane is adopted as the plane containing the optical axis of the first lens unit G1 and the optical axis of the third lens unit G3. In lateral aberration diagram shown in FIG. 21, the meridional plane is adopted as the plane containing the optical axis of the first lens unit G1 and the optical axis of the second lens unit G2.

In the zoom lens system according to each of Numerical Examples 1 to 6, the amount of movement of the third lens unit G3 in a direction perpendicular to the optical axis in an image blur compensation state at a telephoto limit is as follows. In the zoom lens system according to Numerical Example 7, the amount of movement of the second lens unit G2 in a direction perpendicular to the optical axis in an image blur compensation state at a telephoto limit is as follows.
Numerical Example 1 0.094 mm
Numerical Example 2 0.082 mm
Numerical Example 3 0.105 mm
Numerical Example 4 0.107 mm
Numerical Example 5 0.091 mm
Numerical Example 6 0.118 mm
Numerical Example 7 0.061 mm Here, when the shooting distance is infinity, at a telephoto limit, the amount of image decentering in a case that the zoom lens system inclines by 0.3° is equal to the amount of image decentering in a case that the entirety of the third lens unit G3 or the entirety of the second lens unit G2 moves in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel movement desired for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 39.12230 | 0.75000 | 1.84666 | 23.8 |
| 2 | 24.34130 | 0.01000 | 1.56732 | 42.8 |
| 3 | 24.34130 | 2.57250 | 1.49700 | 81.6 |
| 4 | 669.01800 | 0.15000 | | |
| 5 | 24.12950 | 1.79680 | 1.72916 | 54.7 |
| 6 | 79.16250 | Variable | | |
| 7* | 40.41520 | 0.50000 | 1.87702 | 37.0 |
| 8* | 4.92640 | 3.70580 | | |
| 9 | −8.33810 | 0.30000 | 1.72916 | 54.7 |
| 10 | −88.01810 | 0.22870 | | |
| 11 | 27.63010 | 1.21460 | 1.94595 | 18.0 |
| 12 | −34.07630 | Variable | | |
| 13* | 5.61650 | 2.15450 | 1.58332 | 59.1 |
| 14* | −22.78570 | 0.50340 | | |
| 15 | 8.07340 | 1.26250 | 1.49700 | 81.6 |
| 16 | −490.35460 | 0.01000 | 1.56732 | 42.8 |
| 17 | −490.35460 | 0.30000 | 1.90366 | 31.3 |
| 18 | 4.81270 | 0.35810 | | |
| 19 | 12.15960 | 1.20290 | 1.52996 | 55.8 |
| 20 | −11.64830 | 0.40000 | | |
| 21(Diaphragm) | ∞ | Variable | | |
| 22 | 30.16120 | 0.50000 | 1.88300 | 40.8 |
| 23 | 8.20900 | Variable | | |
| 24* | 9.68560 | 2.23030 | 1.52996 | 55.8 |
| 25* | −93.78700 | 2.36430 | | |
| 26 | ∞ | 0.78000 | 1.51680 | 64.2 |
| 27 | ∞ | (BF) | | |
| Image surface | ∞ | | | |

TABLE 2

(Aspherical data)

Surface No. 7

K = 0.00000E+00, A4 = −5.63481E−04, A6 = 3.11555E−05, A8 = −8.17750E−07 A10 = 8.06105E−09, A12 = 0.00000E+00
Surface No. 8

K = 0.00000E+00, A4 = −8.76674E−04, A6 = −1.12420E−05, A8 = 2.70324E−06 A10 = −1.33807E−07, A12 = 0.00000E+00
Surface No. 13

K = 0.00000E+00, A4 = −7.29201E−04, A6 = −1.17969E−05, A8 = −6.10823E−06 A10 = 6.74583E−07, A12 = −4.48240E−08
Surface No. 14

K = 0.00000E+00, A4 = 8.59168E−05, A6 = −2.47587E−05, A8 = −1.87567E−06 A10 = 1.46231E−07, A12 = −2.05601E−08
Surface No. 24

K = 0.00000E+00, A4 = −6.47588E−04, A6 = 8.67198E−05, A8 = −5.62682E−06 A10 = 1.93110E−07, A12 = −4.72323E−09
Surface No. 25

K = 0.00000E+00, A4 = −7.33472E−04, A6 = 3.89493E−05, A8 = −1.04425E−06 A10 = −4.32516E−08, A12 = 0.00000E+00

TABLE 3

(Various data)

Zooming ratio 14.71263

| | Wide-angle limit | Middle position | Telephoto limit |
|---|---|---|---|
| Focal length | 4.4482 | 17.0693 | 65.4446 |
| F-number | 3.44055 | 4.49104 | 6.16167 |
| View angle | 45.0718 | 12.6331 | 3.4043 |
| Image height | 3.7000 | 3.9000 | 3.9000 |
| Overall length of lens system | 46.3632 | 51.3938 | 62.4654 |
| BF | 0.48241 | 0.50874 | 0.45483 |
| d6 | 0.3000 | 10.7372 | 21.3604 |
| d12 | 16.7953 | 5.1183 | 0.3000 |
| d21 | 3.4276 | 9.1186 | 10.4391 |

TABLE 3-continued (Various data)

| | | | |
|---|---|---|---|
| d23 | 2.0635 | 2.6166 | 6.6167 |
| Entrance pupil position | 11.0268 | 35.9621 | 125.0203 |
| Exit pupil position | −11.4186 | −20.0329 | −54.5925 |
| Front principal points position | 13.8124 | 38.8475 | 112.6593 |
| Back principal points position | 41.9150 | 34.3246 | −2.9791 |

Single lens data

| Lens element | Initial surface number | Focal length |
|---|---|---|
| 1 | 1 | −77.9069 |
| 2 | 3 | 50.7587 |
| 3 | 5 | 46.9551 |
| 4 | 7 | −6.4393 |
| 5 | 9 | −12.6519 |
| 6 | 11 | 16.2860 |
| 7 | 13 | 7.9466 |
| 8 | 15 | 15.9947 |
| 9 | 17 | −5.2725 |
| 10 | 19 | 11.4258 |
| 11 | 22 | −12.9111 |
| 12 | 24 | 16.6900 |

Zoom lens unit data

| Lens unit | Initial surface No. | Focal length | Overall length of lens unit | Front principal points position | Back principal points position |
|---|---|---|---|---|---|
| 1 | 1 | 36.28987 | 5.27930 | 1.15149 | 3.09442 |
| 2 | 7 | −5.85194 | 5.94910 | 0.35671 | 1.13559 |
| 3 | 13 | 9.23453 | 6.19140 | −0.30820 | 1.47404 |
| 4 | 22 | −12.91111 | 0.50000 | 0.36877 | 0.60037 |
| 5 | 24 | 16.68996 | 5.37460 | 0.13748 | 1.16482 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.21205 | −0.34104 | −0.89535 |
| 3 | 13 | −0.48200 | −1.12114 | −1.38610 |
| 4 | 22 | 1.66825 | 1.71504 | 2.01678 |
| 5 | 24 | 0.71886 | 0.71728 | 0.72051 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 31.08320 | 0.75000 | 1.84666 | 23.8 |
| 2 | 20.54660 | 0.01000 | 1.56732 | 42.8 |
| 3 | 20.54660 | 2.64550 | 1.49700 | 81.6 |
| 4 | 152.85880 | 0.15000 | | |
| 5 | 24.63830 | 1.66280 | 1.72916 | 54.7 |
| 6 | 107.30480 | Variable | | |
| 7* | 49.15490 | 0.50000 | 1.87702 | 37.0 |
| 8* | 5.54240 | 3.71900 | | |
| 9 | −10.64890 | 0.30000 | 1.72916 | 54.7 |
| 10 | 112.56090 | 0.22460 | | |
| 11 | 20.71430 | 1.29040 | 1.94595 | 18.0 |
| 12 | −81.81860 | Variable | | |
| 13* | 5.43680 | 1.87130 | 1.58332 | 59.1 |
| 14* | −22.36220 | 0.40260 | | |
| 15 | 6.57880 | 1.45360 | 1.49700 | 81.6 |
| 16 | 46.91020 | 0.01000 | 1.56732 | 42.8 |
| 17 | 46.91020 | 0.30000 | 1.90366 | 31.3 |
| 18 | 4.17360 | 0.30410 | | |
| 19 | 7.92300 | 1.07350 | 1.52996 | 55.8 |
| 20 | −15.71980 | 0.40000 | | |
| 21(Diaphragm) | ∞ | Variable | | |
| 22 | 19.40140 | 0.50000 | 1.88300 | 40.8 |
| 23 | 5.56050 | Variable | | |
| 24* | 9.90500 | 2.27410 | 1.52996 | 55.8 |
| 25* | −84.49410 | 2.25770 | | |
| 26 | ∞ | 0.78000 | 1.51680 | 64.2 |
| 27 | ∞ | (BF) | | |
| Image surface | ∞ | | | |

TABLE 5

(Aspherical data)

Surface No. 7

K = 0.00000E+00, A4 = −6.82260E−04, A6 = 3.42662E−05,
A8 = −7.06863E−07 A10 = 5.24073E−09, A12 = 0.00000E+00

Surface No. 8

K = 0.00000E+00, A4 = −8.55257E−04, A6 = −2.08462E−06,
A8 = 2.57595E−06 A10 = −7.86710E−08, A12 = 0.00000E+00

Surface No. 13

K = 0.00000E+00, A4 = −7.38915E−04, A6 = 6.12372E−06,
A8 = −7.45037E−06 A10 = 7.92758E−07, A12 = −5.22500E−08

Surface No. 14

K = 0.00000E+00, A4 = 1.71678E−04, A6 = 7.80329E−06,
A8 = −4.99088E−06 A10 = 3.22395E−07, A12 = −2.42946E−08

Surface No. 24

K = 0.00000E+00, A4 = −4.14254E−04, A6 = 1.04417E−04,
A8 = −5.96937E−06 A10 = 1.47200E−07, A12 = −3.27839E−09

Surface No. 25

K = 0.00000E+00, A4 = −8.50740E−04, A6 = 9.56957E−05,
A8 = −5.15879E−06 A10 = 3.50417E−08, A12 = 0.00000E+00

TABLE 6

(Various data)

Zooming ratio 11.03063

| | Wide-angle limit | Middle position | Telephoto limit |
|---|---|---|---|
| Focal length | 4.4498 | 14.8500 | 49.0837 |
| F-number | 3.44101 | 4.73422 | 6.16062 |
| View angle | 42.8989 | 14.5685 | 4.5571 |
| Image height | 3.5000 | 3.9000 | 3.9000 |
| Overall length of lens system | 47.2343 | 46.2180 | 52.9687 |
| BF | 0.48722 | 0.48685 | 0.45643 |
| d6 | 0.3000 | 8.1432 | 17.4571 |
| d12 | 19.1524 | 6.1570 | 0.3000 |
| d21 | 1.6677 | 4.6342 | 6.6017 |
| d23 | 2.7478 | 3.9176 | 5.2743 |

TABLE 6-continued (Various data)

| | | | |
|---|---|---|---|
| Entrance pupil position | 12.0384 | 30.0889 | 89.9355 |
| Exit pupil position | −10.1822 | −16.6238 | −24.5944 |
| Front principal points position | 14.6324 | 32.0509 | 42.8463 |
| Back principal points position | 42.7846 | 31.3680 | 3.8850 |

Single lens data

| Lens element | Initial surface number | Focal length |
|---|---|---|
| 1 | 1 | −74.0055 |
| 2 | 3 | 47.4464 |
| 3 | 5 | 43.4920 |
| 4 | 7 | −7.1611 |
| 5 | 9 | −13.3284 |
| 6 | 11 | 17.5816 |
| 7 | 13 | 7.6883 |
| 8 | 15 | 15.2143 |
| 9 | 17 | −5.0866 |
| 10 | 19 | 10.0990 |
| 11 | 22 | −8.9793 |
| 12 | 24 | 16.8698 |

Zoom lens unit data

| Lens unit | Initial surface No. | Focal length | Overall length of lens unit | Front principal points position | Back principal points position |
|---|---|---|---|---|---|
| 1 | 1 | 33.79578 | 5.21830 | 1.12238 | 3.01496 |
| 2 | 7 | −6.26139 | 6.03400 | 0.48676 | 1.44491 |
| 3 | 13 | 8.11525 | 5.81510 | −0.43186 | 1.41460 |
| 4 | 22 | −8.97929 | 0.50000 | 0.37862 | 0.60851 |
| 5 | 24 | 16.86977 | 5.31180 | 0.15727 | 1.19825 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.25511 | −0.37491 | −0.84760 |
| 3 | 13 | −0.35202 | −0.75087 | −1.02588 |
| 4 | 22 | 2.01596 | 2.14616 | 2.29086 |
| 5 | 24 | 0.72728 | 0.72730 | 0.72910 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 57.54400 | 0.75000 | 1.84666 | 23.8 |
| 2 | 32.90100 | 0.01000 | 1.56732 | 42.8 |
| 3 | 32.90100 | 2.61090 | 1.49700 | 81.6 |
| 4 | −118.20340 | 0.15000 | | |
| 5 | 24.21850 | 1.52590 | 1.72916 | 54.7 |
| 6 | 50.97680 | Variable | | |
| 7* | 29.35900 | 0.50000 | 1.87702 | 37.0 |
| 8* | 5.29960 | 4.05300 | | |
| 9 | −7.89080 | 0.30000 | 1.72916 | 54.7 |
| 10 | −60.13670 | 0.23680 | | |
| 11 | 41.52720 | 1.27550 | 1.94595 | 18.0 |
| 12 | −26.55800 | Variable | | |
| 13* | 6.06960 | 2.37110 | 1.58332 | 59.1 |
| 14* | −23.88150 | 0.31890 | | |
| 15 | 7.14320 | 1.38840 | 1.49700 | 81.6 |
| 16 | 109.61190 | 0.01000 | 1.56732 | 42.8 |
| 17 | 109.61190 | 0.30000 | 1.90366 | 31.3 |
| 18 | 4.95430 | 0.45800 | | |
| 19 | 23.14400 | 1.09800 | 1.52996 | 55.8 |
| 20 | −12.30130 | 0.40000 | | |
| 21(Diaphragm) | ∞ | Variable | | |
| 22 | 30.20470 | 0.50000 | 1.88300 | 40.8 |
| 23 | 10.26950 | Variable | | |
| 24* | 10.66430 | 2.04270 | 1.52996 | 55.8 |
| 25* | −98.22820 | 2.84340 | | |
| 26 | ∞ | 0.78000 | 1.51680 | 64.2 |
| 27 | ∞ | (BF) | | |
| Image surface | ∞ | | | |

TABLE 8

(Aspherical data)

Surface No. 7

K = 0.00000E+00, A4 = −7.15790E−04, A6 = 3.34579E−05,
A8 = −6.64896E−07 A10 = 4.88846E−09, A12 = 0.00000E+00

Surface No. 8

K = 0.00000E+00, A4 = −9.90606E−04, A6 = −3.67284E−06,
A8 = 1.95498E−06 A10 = −6.58573E−08, A12 = 0.00000E+00

Surface No. 13

K = 0.00000E+00, A4 = −6.16082E−04, A6 = −3.68104E−07,
A8 = −5.75983E−06 A10 = 5.43157E−07, A12 = −2.72234E−08

Surface No. 14

K = 0.00000E+00, A4 = 1.78340E−05, A6 = −3.72044E−06,
A8 = −4.60879E−06 A10 = 4.06332E−07, A12 = −2.11784E−08

Surface No. 24

K = 0.00000E+00, A4 = −1.08567E−03, A6 = 1.14745E−04,
A8 = −6.05001E−06 A10 = 1.55891E−07, A12 = −2.89195E−09

Surface No. 25

K = 0.00000E+00, A4 = −1.36541E−03, A6 = 1.09701E−04,
A8 = −4.19438E−06 A10 = 2.41875E−08, A12 = 0.00000E+00

TABLE 9

(Various data)

Zooming ratio 16.47230

| | Wide-angle limit | Middle position | Telephoto limit |
|---|---|---|---|
| Focal length | 4.4501 | 18.0934 | 73.3027 |
| F-number | 3.44164 | 4.20219 | 6.16157 |
| View angle | 41.5033 | 11.9452 | 3.0330 |
| Image height | 3.4000 | 3.9000 | 3.9000 |
| Overall length of lens system | 49.0167 | 55.3864 | 70.1058 |
| BF | 0.49135 | 0.52241 | 0.45938 |
| d6 | 0.3000 | 12.2557 | 24.4860 |
| d12 | 18.5099 | 5.2649 | 0.3000 |
| d21 | 3.6190 | 11.3314 | 12.4827 |
| d23 | 2.1738 | 2.0894 | 8.4551 |
| Entrance pupil | 11.3371 | 38.4866 | 134.4812 |

TABLE 9-continued (Various data)

| position | | | |
|---|---|---|---|
| Exit pupil position | −12.3397 | −22.9441 | −128.8978 |
| Front principal points position | 14.2438 | 42.6294 | 166.2455 |
| Back principal points position | 44.5666 | 37.2930 | −3.1969 |

Single lens data

| Lens element | Initial surface number | Focal length |
|---|---|---|
| 1 | 1 | −92.0253 |
| 2 | 3 | 52.0843 |
| 3 | 5 | 61.7901 |
| 4 | 7 | −7.4461 |
| 5 | 9 | −12.4864 |
| 6 | 11 | 17.2815 |
| 7 | 13 | 8.5459 |
| 8 | 15 | 15.3058 |
| 9 | 17 | −5.7498 |
| 10 | 19 | 15.3205 |
| 11 | 22 | −17.8312 |
| 12 | 24 | 18.2708 |

Zoom lens unit data

| Lens unit | Initial surface No. | Focal length | Overall length of lens unit | Front principal points position | Back principal points position |
|---|---|---|---|---|---|
| 1 | 1 | 41.06452 | 5.04680 | 1.21748 | 3.07560 |
| 2 | 7 | −6.41603 | 6.36530 | 0.48274 | 1.30249 |
| 3 | 13 | 10.09615 | 6.34440 | −0.66695 | 1.36063 |
| 4 | 22 | −17.83121 | 0.50000 | 0.40711 | 0.63842 |
| 5 | 24 | 18.27085 | 5.66610 | 0.13161 | 1.09620 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.20116 | −0.32179 | −0.83233 |
| 3 | 13 | −0.49210 | −1.25492 | −1.58845 |
| 4 | 22 | 1.51412 | 1.51273 | 1.86297 |
| 5 | 24 | 0.72299 | 0.72129 | 0.72474 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 38.10960 | 0.75000 | 1.84666 | 23.8 |
| 2 | 25.35260 | 0.01000 | 1.56732 | 42.8 |
| 3 | 25.35260 | 2.78990 | 1.49700 | 81.6 |
| 4 | −642.15170 | 0.15000 | | |
| 5 | 24.04300 | 1.82120 | 1.61800 | 63.4 |
| 6 | 73.35630 | Variable | | |
| 7* | 77.53870 | 0.30000 | 1.80470 | 41.0 |
| 8* | 5.12330 | 3.46690 | | |
| 9 | −8.13460 | 0.30000 | 1.77250 | 49.6 |
| 10 | −131.30370 | 0.36710 | | |
| 11 | 31.35140 | 1.09790 | 1.94595 | 18.0 |
| 12 | −31.35140 | Variable | | |
| 13(Diaphragm) | ∞ | 0.30000 | | |
| 14* | 5.94890 | 2.03240 | 1.58332 | 59.1 |
| 15* | −17.80730 | 0.70000 | | |
| 16 | 9.26870 | 1.39790 | 1.51680 | 64.2 |
| 17 | −68.21660 | 0.01000 | 1.56732 | 42.8 |
| 18 | −68.21660 | 0.30000 | 1.90366 | 31.3 |
| 19 | 4.90140 | 0.35620 | | |
| 20 | 8.27820 | 1.21480 | 1.54310 | 56.0 |
| 21 | −22.95510 | Variable | | |
| 22 | 86.76290 | 0.30000 | 1.83481 | 42.7 |
| 23 | 9.62100 | Variable | | |
| 24* | 8.23900 | 2.36560 | 1.54310 | 56.0 |
| 25* | −166.66670 | 2.97250 | | |
| 26 | ∞ | 0.78000 | 1.51680 | 64.2 |
| 27 | ∞ | (BF) | | |
| Image surface | ∞ | | | |

TABLE 11

(Aspherical data)

Surface No. 7

K = 0.00000E+00, A4 = −2.43832E−04, A6 = 3.09032E−05, A8 = −9.76061E−07
A10 = 9.97676E−09, A12 = 0.00000E+00, A14 = 0.00000E+00, A16 = 0.00000E+00
Surface No. 8

K = 0.00000E+00, A4 = −4.35886E−04, A6 = −1.88562E−05, A8 = 7.93244E−06
A10 = −5.17166E−07, A12 = 1.49341E−08, A14 = −2.91643E−12, A16 = −9.80475E−12
Surface No. 14

K = 0.00000E+00, A4 = −6.32762E−04, A6 = 7.96501E−07, A8 = −6.15899E−06
A10 = 7.67277E−07, A12 = −5.16774E−08, A14 = 0.00000E+00, A16 = 0.00000E+00
Surface No. 15

K = 0.00000E+00, A4 = 1.12134E−04, A6 = −1.00326E−05, A8 = −8.86762E−07
A10 = −4.22673E−10, A12 = −1.38890E−08, A14 = 0.00000E+00, A16 = 0.00000E+00
Surface No. 24

K = 0.00000E+00, A4 = −3.87357E−04, A6 = 3.77291E−05, A8 = −3.04711E−06
A10 = 1.13074E−07, A12 = −2.82329E−09, A14 = 0.00000E+00, A16 = 0.00000E+00

TABLE 11-continued (Aspherical data)

Surface No. 25

K = 0.00000E+00, A4 = −2.37072E−04, A6 = 2.09946E−05, A8 = −1.36284E−06
A10 = −7.22202E−09, A12 = 0.00000E+00, A14 = 0.00000E+00, A16 = 0.00000E+00

TABLE 12

(Various data)

Zooming ratio 14.70813

| | Wide-angle limit | Middle position | Telephoto limit |
|---|---|---|---|
| Focal length | 4.4497 | 17.0715 | 65.4465 |
| F-number | 3.44057 | 4.93618 | 6.13742 |
| View angle | 44.8465 | 12.6355 | 3.3530 |
| Image height | 3.7000 | 3.9000 | 3.9000 |
| Overall length of lens system | 48.4953 | 54.1777 | 64.9678 |
| BF | 0.48583 | 0.51702 | 0.45765 |
| d6 | 0.3000 | 11.8239 | 23.0982 |
| d12 | 17.5156 | 5.7604 | 0.8791 |
| d21 | 2.9673 | 9.6372 | 11.7242 |
| d23 | 3.4442 | 2.6568 | 5.0262 |
| Entrance pupil position | 10.6950 | 36.6197 | 120.0867 |
| Exit pupil position | −23.9052 | −32.1572 | −84.5633 |
| Front principal points position | 14.3330 | 44.7717 | 135.1546 |
| Back principal points position | 44.0456 | 37.1062 | −0.4787 |

Single lens data

| Lens element | Initial surface number | Focal length |
|---|---|---|
| 1 | 1 | −91.9315 |
| 2 | 3 | 49.1423 |
| 3 | 5 | 57.0679 |
| 4 | 7 | −6.8298 |
| 5 | 9 | −11.2376 |
| 6 | 11 | 16.7137 |
| 7 | 14 | 7.8933 |
| 8 | 16 | 15.8872 |
| 9 | 18 | −5.0505 |
| 10 | 20 | 11.3580 |
| 11 | 22 | −12.9851 |
| 12 | 24 | 14.5249 |

Zoom lens unit data

| Lens unit | Initial surface No. | Focal length | Overall of length lens unit | Front principal points position | Back principal points position |
|---|---|---|---|---|---|
| 1 | 1 | 37.80453 | 5.52110 | 1.10917 | 3.06143 |
| 2 | 7 | −5.67153 | 5.53190 | 0.37885 | 1.06457 |
| 3 | 13 | 9.41307 | 6.31130 | −0.37817 | 1.66831 |
| 4 | 22 | −12.98510 | 0.30000 | 0.18422 | 0.32043 |
| 5 | 24 | 14.52486 | 6.11810 | 0.07256 | 1.16357 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.19561 | −0.32463 | −0.91531 |
| 3 | 13 | −0.49614 | −1.18416 | −1.46668 |
| 4 | 22 | 1.93913 | 1.88465 | 2.05543 |
| 5 | 24 | 0.62544 | 0.62330 | 0.62738 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 29.50560 | 0.75000 | 1.84666 | 23.8 |
| 2 | 20.30020 | 0.01000 | 1.56732 | 42.8 |
| 3 | 20.30020 | 2.28950 | 1.49700 | 81.6 |
| 4 | 162.76100 | 0.15000 | | |
| 5 | 20.71550 | 1.62350 | 1.61800 | 63.4 |
| 6 | 79.60740 | Variable | | |
| 7* | 90.12470 | 0.30000 | 1.80470 | 41.0 |
| 8* | 5.01100 | 3.45700 | | |
| 9 | −8.05880 | 0.30000 | 1.77250 | 49.6 |
| 10 | −85.88260 | 0.33570 | | |
| 11 | 31.52910 | 1.08950 | 1.94595 | 18.0 |
| 12 | −31.52910 | Variable | | |
| 13(Diaphragm) | ∞ | 0.30000 | | |
| 14* | 5.71080 | 1.99000 | 1.58332 | 59.1 |
| 15* | −17.52600 | 0.70010 | | |
| 16 | 8.42610 | 1.26090 | 1.51680 | 64.2 |
| 17 | −71.90270 | 0.01000 | 1.56732 | 42.8 |
| 18 | −71.90270 | 0.30000 | 1.90366 | 31.3 |
| 19 | 4.68850 | 0.35310 | | |
| 20 | 7.79650 | 1.25280 | 1.54310 | 56.0 |
| 21 | −21.70030 | Variable | | |
| 22 | 48.88550 | 0.30000 | 1.83481 | 42.7 |
| 23 | 8.08190 | Variable | | |
| 24* | 8.03430 | 2.13500 | 1.54310 | 56.0 |
| 25* | −166.66670 | 2.73670 | | |
| 26 | ∞ | 0.78000 | 1.51680 | 64.2 |
| 27 | ∞ | (BF) | | |
| Image surface | ∞ | | | |

TABLE 14

(Aspherical data)

Surface No. 7

K = 0.00000E+00, A4 = −3.18533E−04, A6 = 3.55924E−05, A8 = −1.01356E−06
A10 = 9.22264E−09, A12 = 0.00000E+00, A14 = 0.00000E+00, A16 = 0.00000E+00

Surface No. 8

K = 0.00000E+00, A4 = −5.37324E−04, A6 = −2.34009E−05, A8 = 1.04166E−05
A10 = −9.38688E−07, A12 = 4.07741E−08, A14 = 1.57540E−11, A16 = −3.87512E−11

Surface No. 14

K = 0.00000E+00, A4 = −6.22701E−04, A6 = −5.86876E−06, A8 = −4.35896E−06
A10 = 5.04985E−07, A12 = −3.59114E−08, A14 = 0.00000E+00, A16 = 0.00000E+00

Surface No. 15

K = 0.00000E+00, A4 = 2.35682E−04, A6 = −9.86043E−06, A8 = −1.51818E−06
A10 = 8.50833E−08, A12 = −1.43231E−08, A14 = 0.00000E+00, A16 = 0.00000E+00

Surface No. 24

K = 0.00000E+00, A4 = 6.44821E−05, A6 = 2.92458E−06, A8 = −2.26083E−06
A10 = 8.03181E−08, A12 = −1.32337E−09, A14 = 0.00000E+00, A16 = 0.00000E+00

Surface No. 25

K = 0.00000E+00, A4 = 4.83691E−04, A6 = −3.72234E−05, A8 = −1.14449E−06
A10 = 3.63588E−08, A12 = 0.00000E+00, A14 = 0.00000E+00, A16 = 0.00000E+00

TABLE 15

(Various data)

Zooming ratio 11.03066

| | Wide-angle limit | Middle position | Telephoto limit |
|---|---|---|---|
| Focal length | 4.4500 | 15.0214 | 49.0864 |
| F-number | 3.44052 | 4.83310 | 6.13613 |
| View angle | 43.9176 | 14.3782 | 4.4694 |
| Image height | 3.6000 | 3.9000 | 3.9000 |
| Overall length of lens system | 46.0390 | 47.5734 | 56.9703 |
| BF | 0.49075 | 0.50200 | 0.45938 |
| d6 | 0.3000 | 8.2150 | 17.4900 |
| d12 | 16.7821 | 5.2667 | 0.8840 |
| d21 | 2.6710 | 8.4157 | 11.0757 |
| d23 | 3.3714 | 2.7502 | 4.6374 |
| Entrance pupil position | 10.2859 | 26.3657 | 75.3817 |
| Exit pupil position | −22.0284 | −28.4421 | −60.8186 |
| Front principal points position | 13.8566 | 33.5913 | 85.1477 |
| Back principal points position | 41.5890 | 32.5520 | 7.8838 |

Single lens data

| Lens element | Initial surface number | Focal length |
|---|---|---|
| 1 | 1 | −79.8334 |
| 2 | 3 | 46.4184 |
| 3 | 5 | 44.8391 |
| 4 | 7 | −6.6042 |
| 5 | 9 | −11.5317 |
| 6 | 11 | 16.8066 |
| 7 | 14 | 7.6246 |
| 8 | 16 | 14.6726 |
| 9 | 18 | −4.8617 |
| 10 | 20 | 10.7214 |
| 11 | 22 | −11.6376 |
| 12 | 24 | 14.1740 |

TABLE 15-continued (Various data)

Zoom lens unit data

| Lens unit | Initial surface No. | Focal length | Overall length of lens unit | Front principal points position | Back principal points position |
|---|---|---|---|---|---|
| 1 | 1 | 32.90701 | 4.82300 | 0.85776 | 2.56382 |
| 2 | 7 | −5.58020 | 5.48220 | 0.35035 | 1.02982 |
| 3 | 13 | 8.88719 | 6.16690 | −0.19177 | 1.72324 |
| 4 | 22 | −11.63758 | 0.30000 | 0.19655 | 0.33249 |
| 5 | 24 | 14.17404 | 5.65170 | 0.06390 | 1.07511 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.22853 | −0.33815 | −0.77210 |
| 3 | 13 | −0.46748 | −1.09620 | −1.44599 |
| 4 | 22 | 1.97012 | 1.91908 | 2.07240 |
| 5 | 24 | 0.64249 | 0.64170 | 0.64470 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 39.25250 | 0.75000 | 1.84666 | 23.8 |
| 2 | 26.16450 | 0.01000 | 1.56732 | 42.8 |
| 3 | 26.16450 | 2.76770 | 1.49700 | 81.6 |
| 4 | −665.87080 | 0.15000 | | |

TABLE 16-continued (Surface data)

| Surface number | r | d | nd | vd |
|---|---|---|---|---|
| 5 | 24.07010 | 1.82930 | 1.61800 | 63.4 |
| 6 | 70.08620 | Variable | | |
| 7* | 81.24860 | 0.30000 | 1.80470 | 41.0 |
| 8* | 5.36480 | 3.48490 | | |
| 9 | −8.41640 | 0.30000 | 1.77250 | 49.6 |
| 10 | 673.41420 | 0.42160 | | |
| 11 | 31.11300 | 1.14240 | 1.94595 | 18.0 |
| 12 | −31.11300 | Variable | | |
| 13(Diaphragm) | ∞ | 0.30000 | | |
| 14* | 8.12620 | 1.87340 | 1.58332 | 59.1 |
| 15* | −15.38680 | 0.98510 | | |
| 16 | 8.63450 | 1.80160 | 1.51680 | 64.2 |
| 17 | −27.64690 | 0.01000 | 1.56732 | 42.8 |
| 18 | −27.64690 | 0.30000 | 1.90366 | 31.3 |
| 19 | 6.41180 | 0.45960 | | |
| 20 | 20.19940 | 1.11910 | 1.54310 | 56.0 |
| 21 | −13.88010 | Variable | | |
| 22 | 67.47690 | 0.30000 | 1.83481 | 42.7 |
| 23 | 12.04360 | Variable | | |
| 24* | 9.17150 | 1.88180 | 1.54310 | 56.0 |
| 25* | −164.30470 | 3.64070 | | |
| 26 | ∞ | 0.78000 | 1.51680 | 64.2 |
| 27 | ∞ | (BF) | | |
| Image surface | ∞ | | | |

TABLE 17

(Aspherical data)

Surface No. 7

K = 0.00000E+00, A4 = −3.23786E−04, A6 = 3.66448E−05, A8 = −1.06013E−06
A10 = 1.00154E−08, A12 = 0.00000E+00, A14 = 0.00000E+00, A16 = 0.00000E+00

Surface No. 8

K = 0.00000E+00, A4 = −4.75344E−04, A6 = −1.50151E−05, A8 = 8.86557E−06
A10 = −7.66806E−07, A12 = 3.85951E−08, A14 = −8.58029E−10, A16 = 1.55704E−12

Surface No. 14

K = 0.00000E+00, A4 = −6.17610E−04, A6 = −1.27913E−05, A8 = −5.01159E−06
A10 = 3.57293E−07, A12 = −3.16898E−08, A14 = 0.00000E+00, A16 = 0.00000E+00

Surface No. 15

K = 0.00000E+00, A4 = −2.21972E−04, A6 = −1.71845E−05, A8 = −3.42507E−06
A10 = 1.05513E−07, A12 = −1.50385E−08, A14 = 0.00000E+00, A16 = 0.00000E+00

Surface No. 24

K = 0.00000E+00, A4 = 1.14280E−04, A6 = 1.52328E−05, A8 = −2.82688E−06
A10 = 1.17459E−07, A12 = −3.65809E−09, A14 = 0.00000E+00, A16 = 0.00000E+00

Surface No. 25

K = 0.00000E+00, A4 = 5.10887E−04, A6 = −1.82374E−05, A8 = −5.43331E−07
A10 = −2.93424E−08, A12 = 0.00000E+00, A14 = 0.00000E+00, A16 = 0.00000E+00

TABLE 18

(Various data)

Zooming ratio 16.47220

| | Wide-angle limit | Middle position | Telephoto limit |
|---|---|---|---|
| Focal length | 4.4500 | 18.0951 | 73.3017 |
| F-number | 3.44047 | 4.99381 | 6.13817 |
| View angle | 44.8967 | 11.9877 | 2.9917 |
| Image height | 3.7000 | 3.9000 | 3.9000 |
| Overall length of lens system | 52.5325 | 58.6836 | 69.8425 |
| BF | 0.49889 | 0.49462 | 0.45413 |
| d6 | 0.3000 | 12.5338 | 24.2209 |
| d12 | 19.2741 | 6.3027 | 0.8571 |
| d21 | 2.4026 | 10.8191 | 13.5974 |
| d23 | 5.4497 | 3.9262 | 6.1058 |
| Entrance pupil position | 10.9122 | 39.1491 | 132.3414 |
| Exit pupil position | −37.5373 | −57.9325 | −287.3651 |
| Front principal points position | 14.8416 | 51.6401 | 186.9747 |
| Back principal points position | 48.0825 | 40.5885 | −3.4591 |

Single lens data

| Lens element | Initial surface number | Focal length |
|---|---|---|
| 1 | 1 | −95.1828 |
| 2 | 3 | 50.7221 |
| 3 | 5 | 58.4344 |
| 4 | 7 | −7.1508 |
| 5 | 9 | −10.7585 |
| 6 | 11 | 16.5935 |
| 7 | 14 | 9.3920 |
| 8 | 16 | 12.9506 |
| 9 | 18 | −5.7356 |
| 10 | 20 | 15.3252 |
| 11 | 22 | −17.6045 |
| 12 | 24 | 16.0558 |

Zoom lens unit data

| Lens unit | Initial surface No. | Focal length | Overall length of lens unit | Front principal points position | Back principal points position |
|---|---|---|---|---|---|
| 1 | 1 | 38.73439 | 5.50700 | 1.07264 | 3.02435 |
| 2 | 7 | −5.76063 | 5.64890 | 0.42621 | 1.13613 |
| 3 | 13 | 10.30241 | 6.84880 | −0.11156 | 1.88515 |

TABLE 18-continued (Various data)

| | | | | | |
|---|---|---|---|---|---|
| 4 | 22 | −17.60450 | 0.30000 | 0.19952 | 0.33561 |
| 5 | 24 | 16.05580 | 6.30250 | 0.06472 | 0.98811 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.19354 | −0.32859 | −0.98573 |
| 3 | 13 | −0.50880 | −1.27900 | −1.61102 |
| 4 | 22 | 1.82885 | 1.74171 | 1.85990 |
| 5 | 24 | 0.63793 | 0.63820 | 0.64072 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1* | 107.61930 | 0.30000 | 1.80470 | 41.0 |
| 2* | 4.80030 | 2.22660 | | |
| 3 | 9.23190 | 1.30640 | 2.01960 | 21.5 |
| 4 | 17.02490 | Variable | | |
| 5* | 6.15710 | 1.10820 | 1.80470 | 41.0 |
| 6 | 25.14250 | 0.15000 | | |
| 7 | 4.83310 | 1.80860 | 1.49700 | 81.6 |
| 8 | 16.80910 | 0.01000 | 1.56732 | 42.8 |
| 9 | 16.80910 | 0.30000 | 1.84666 | 23.8 |
| 10 | 3.57810 | 0.62800 | | |
| 11 | 13.95400 | 0.70000 | 1.83481 | 42.7 |
| 12 | −50.59070 | 0.44800 | | |
| 13(Diaphragm) | ∞ | Variable | | |
| 14 | −81.13990 | 0.76170 | 1.48700 | 70.4 |
| 15 | −34.02960 | Variable | | |
| 16 | 33.76820 | 1.38300 | 1.51845 | 70.0 |
| 17* | −20.74100 | 2.00000 | | |
| 18 | ∞ | 0.78000 | 1.51680 | 64.2 |
| 19 | ∞ | (BF) | | |
| Image surface | ∞ | | | |

TABLE 20

(Aspherical data)

Surface No. 1

K = 0.00000E+00, A4 = 5.36509E−06, A6 = −8.80525E−06, A8 = 2.78793E−07
A10 = −2.73007E−09, A12 = 0.00000E+00, A14 = 0.00000E+00, A16 = 0.00000E+00

Surface No. 2

K = −7.90720E−01, A4 = 1.73138E−04, A6 = −2.18061E−05, A8 = 1.60898E−06
A10 = −1.17064E−07, A12 = 5.04376E−09, A14 = −9.09651E−11, A16 = 3.70038E−13

Surface No. 5

K = 0.00000E+00, A4 = −2.13927E−04, A6 = −2.25575E−05, A8 = 7.30892E−06
A10 = −1.49209E−06, A12 = 1.43204E−07, A14 = −5.34905E−09, A16 = 0.00000E+00

Surface No. 17

K = 0.00000E+00, A4 = −2.79314E−04, A6 = 1.31652E−04, A8 = −1.41220E−05
A10 = 6.77625E−07, A12 = −1.21299E−08, A14 = 0.00000E+00, A16 = 0.00000E+00

TABLE 21

(Various data)

Zooming ratio 4.73498

| | Wide-angle limit | Middle position | Telephoto limit |
|---|---|---|---|
| Focal length | 4.6570 | 10.1335 | 22.0509 |
| F-number | 2.90051 | 4.56685 | 6.36731 |
| View angle | 41.9158 | 21.0653 | 9.8562 |
| Image height | 3.7000 | 3.9000 | 3.9000 |
| Overall length of lens system | 34.0477 | 29.8951 | 38.5106 |
| BF | 0.80055 | 0.79714 | 0.79138 |
| d4 | 14.8661 | 4.7519 | 0.3000 |
| d13 | 3.4705 | 7.6218 | 22.5087 |
| d15 | 1.0000 | 2.8138 | 1.0000 |
| Entrance pupil position | 6.9771 | 5.7917 | 4.9350 |
| Exit pupil position | −10.2692 | −26.5545 | 140.8443 |
| Front principal points position | 9.6749 | 12.1708 | 30.4577 |
| Back principal points position | 29.3906 | 19.7616 | 16.4597 |

Single lens data

| Lens element | Initial surface number | Focal length |
|---|---|---|
| 1 | 1 | −6.2520 |
| 2 | 3 | 18.2372 |
| 3 | 5 | 9.8758 |
| 4 | 7 | 12.9975 |
| 5 | 9 | −5.4254 |
| 6 | 11 | 13.1665 |
| 7 | 14 | 119.7162 |
| 8 | 16 | 25.0000 |

Zoom lens unit data

| Lens unit | Initial surface No. | Focal length | Overall length of lens unit | Front principal points position | Back principal points position |
|---|---|---|---|---|---|
| 1 | 1 | −10.88697 | 3.83300 | −0.72858 | −0.10340 |
| 2 | 5 | 9.70236 | 5.15280 | −1.51843 | 0.46068 |
| 3 | 14 | 119.71618 | 0.76170 | 0.87760 | 1.12976 |
| 4 | 16 | 24.99997 | 4.16300 | 0.56917 | 1.29917 |

Magnification of zoom lens unit

| Lens unit | Initial surface No. | Wide-angle limit | Middle position | Telephoto limit |
|---|---|---|---|---|

TABLE 21-continued (Various data)

| 1 | 1  | 0.00000  | 0.00000  | 0.00000  |
|---|----|----------|----------|----------|
| 2 | 5  | −0.52534 | −1.16134 | −2.48614 |
| 3 | 14 | 0.95410  | 0.93899  | 0.95421  |
| 4 | 16 | 0.85342  | 0.85356  | 0.85379  |

The following Table 22 shows the corresponding values to the individual conditions in the zoom lens systems of the numerical examples.

TABLE 22

(Values corresponding to conditions)

| Condition | | Numerical Example | | | | | | |
|---|---|---|---|---|---|---|---|---|
| | | 1 | 2 | 3 | 4 | 5 | 6 | 7 |
| (1) | $L_T/f_T$ | 0.96 | 1.08 | 0.96 | 0.99 | 1.16 | 0.95 | — |
| (2-1) | $D_\alpha/f_{G\alpha}$ | 0.20 | 0.19 | 0.21 | 0.27 | 0.26 | 0.29 | — |
| (a) | $f_T/f_W$ | 14.71 | 11.03 | 16.47 | 14.71 | 11.03 | 16.47 | — |
| (2-2) | $D_\beta/f_{G\beta}$ | — | — | — | — | — | — | 0.13 |
| | $f_T/f_W$ | — | — | — | — | — | — | 4.74 |
| (3) | $f_1/f_2$ | −6.20 | −5.40 | −6.40 | −6.67 | −5.90 | −6.72 | — |
| (4) | $|f_1/f_4|$ | 2.81 | 3.76 | 2.30 | 2.91 | 2.83 | 2.20 | — |

The present disclosure is applicable to a digital input device such as a digital camera, a mobile terminal device such as a smart-phone, a Personal Digital Assistance, a surveillance camera in a surveillance system, a Web camera or a vehicle-mounted camera. In particular, the present disclosure is suitable for a photographing optical system where high image quality is desired like in a digital camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof

What is claimed is:

1. A zoom lens system, in order from an object side to an image side, comprising:
a first lens unit having positive optical power;
a second lens unit having negative optical power;
a third lens unit having positive optical power; and
one or more subsequent lens units, wherein
in zooming from a wide-angle limit to a telephoto limit at the time of image taking, the first lens unit, the second lens unit, and the third lens unit are moved along an optical axis to perform magnification change,
a lens unit α which is one of the subsequent lens units does not move along the optical axis at the time of the zooming, but moves along the optical axis at the time of transition from an imaging state to an accommodated state, and
the following conditions (1), (2-1) and (a) are satisfied:

$$0.8 < L_T/f_T < 1.2 \tag{1}$$

$$0.12 < D_\alpha/f_{G\alpha} < 0.30 \tag{2-1}$$

$$f_T/f_W > 9.0 \tag{a}$$

where,
$L_T$ is an overall length of lens system (a distance from a most object side surface of the first lens unit to an image surface) at a telephoto limit,
$D_\alpha$ is an axial air-equivalent length between a most image side surface of the lens unit α and the image surface,
$f_{G\alpha}$ is a composite focal length of the lens unit α,
$f_W$ is a focal length of the entire system at a wide-angle limit, and
$f_T$ is a focal length of the entire system at a telephoto limit.

2. The zoom lens system as claimed in claim 1, wherein the lens unit α is a lens unit which is located closest to the image side.

3. The zoom lens system as claimed in claim 1 further comprising, as the subsequent lens units, a fourth lens unit having negative optical power, and a fifth lens unit having positive optical power.

4. The zoom lens system as claimed in claim 1, wherein the following condition (3) is satisfied:

$$-7.0 < f_1/f_2 < -4.0 \tag{3}$$

where,
$f_1$ is a composite focal length of the first lens unit, and
$f_2$ is a composite focal length of the second lens unit.

5. The zoom lens system as claimed in claim 3, wherein the following condition (4) is satisfied:

$$0.5 < |f_1/f_4| < 4.2 \tag{4}$$

where,
$f_1$ is a composite focal length of the first lens unit, and
$f_4$ is a composite focal length of the fourth lens unit.

6. The zoom lens system as claimed in claim 3, wherein the fourth lens unit consists of one lens element.

7. The zoom lens system as claimed in claim 3, wherein the fifth lens unit consists of one lens element.

8. The zoom lens system as claimed in claim 3, wherein in focusing from an infinity in-focus condition to a close-object in-focus condition, the fourth lens unit or the fifth lens unit moves along the optical axis.

9. An imaging device capable of outputting an optical image of an object as an electric image signal, comprising:
a zoom lens system that forms the optical image of the object; and an image sensor that converts the optical image formed by the zoom lens system into the electric image signal, wherein the zoom lens system is a zoom lens system as claimed in claim 1.

10. A camera for converting an optical image of an object into an electric image signal, and performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system is a zoom lens system as claimed in claim 1.

* * * * *